United States Patent
McDaniel et al.

(10) Patent No.: US 9,290,690 B2
(45) Date of Patent: Mar. 22, 2016

(54) COATED AND CURED PROPPANTS

(71) Applicant: PREFERRED TECHNOLOGY, LLC, Radnor, PA (US)

(72) Inventors: Robert Ray McDaniel, Cypress, TX (US); Avis Lloyd McCrary, Montgomery, TX (US); Spyridon Monastiriotis, Dallas, TX (US); Ralph Edward Barthel, Wake Forest, NC (US)

(73) Assignee: Preferred Technology, LLC, Radnor, PA (US)

( * ) Notice: Subject to any disclaimer, the term of this patent is extended or adjusted under 35 U.S.C. 154(b) by 376 days.

(21) Appl. No.: 13/626,055

(22) Filed: Sep. 25, 2012

(65) Prior Publication Data
US 2013/0065800 A1 Mar. 14, 2013

Related U.S. Application Data

(63) Continuation-in-part of application No. 13/188,530, filed on Jul. 22, 2011, now Pat. No. 9,040,467, which is a continuation-in-part of application No. 13/099,893, filed on May 3, 2011, now Pat. No. 8,993,489.

(51) Int. Cl.
*C09K 8/60* (2006.01)
*E21B 43/267* (2006.01)
(Continued)

(52) U.S. Cl.
CPC .............. *C09K 8/805* (2013.01); *B05D 3/007* (2013.01); *B05D 7/24* (2013.01)

(58) Field of Classification Search
CPC ....... Y10S 507/901; C09K 8/80; C09K 8/805
USPC ........... 507/129, 219, 233, 234, 249; 166/280
See application file for complete search history.

(56) References Cited

U.S. PATENT DOCUMENTS 2,823,753 A 2/1958 Henderson
3,026,938 A 9/1958 Huth
(Continued)

FOREIGN PATENT DOCUMENTS

GB 1294017 A * 6/1970
WO 2010/049467 5/2010

OTHER PUBLICATIONS

The removal of heavy metal cations by natural zeolites, http://www.resultsrna.com/research/zeolite_binds_heavy_metals.php, pp. 3-7.
(Continued)

*Primary Examiner* — Aiqun Li
(74) *Attorney, Agent, or Firm* — Pepper Hamilton LLP

(57) ABSTRACT

Solid proppants are coated with a coating that exhibits the handling characteristics of a pre-cured coating while also exhibiting the ability to form particle-to-particle bonds at the elevated temperatures and pressures within a wellbore. The coating includes a substantially homogeneous mixture of (i) at least one isocyanate component having at least 2 isocyanate groups, and (ii) a curing agent comprising a monofunctional alcohol, amine or amide. The coating process can be performed with short cycle times, e.g., less than about 4 minutes, and still produce a dry, free-flowing, coated proppant that exhibits low dust characteristics during pneumatic handling but also proppant consolidation downhole for reduced washout and good conductivity. Such proppants also form good unconfined compressive strength without use of an bond activator, are substantially unaffected in bond formation characteristics under downhole conditions despite prior heat exposure, and are resistant to leaching with hot water.

9 Claims, 7 Drawing Sheets

(51) Int. Cl.
*C09K 8/80* (2006.01)
*B05D 3/00* (2006.01)
*B05D 7/24* (2006.01)

(56) References Cited

U.S. PATENT DOCUMENTS

| | | |
|---|---|---|
| 3,805,531 A | 4/1974 | Kistner |
| 3,929,191 A | 12/1975 | Graham |
| 3,976,135 A | 8/1976 | Anderson |
| 4,074,760 A | 2/1978 | Copeland |
| 4,113,014 A | 9/1978 | Kubens |
| 4,199,484 A | 4/1980 | Murphey |
| 4,273,910 A | 6/1981 | Lederer |
| 4,443,347 A | 4/1984 | Underdown |
| 4,518,039 A | 5/1985 | Graham |
| 4,785,884 A | 11/1988 | Armbruster |
| 4,920,192 A | 4/1990 | Wiser-Halladay |
| 5,048,608 A | 9/1991 | Wiser-Halladay |
| 5,188,175 A | 2/1993 | Sweet |
| 5,199,491 A | 4/1993 | Kutta |
| 5,256,729 A | 10/1993 | Kutta |
| 5,582,249 A | 12/1996 | Caveny |
| 5,721,315 A | 2/1998 | Evans |
| 5,733,952 A | 3/1998 | Geoffrey |
| 5,824,462 A * | 10/1998 | Ashida et al. ............... 430/531 |
| 5,924,488 A | 7/1999 | Nguyen |
| 6,079,492 A | 6/2000 | Hoogteijling |
| 6,093,469 A | 7/2000 | Callas |
| 6,114,410 A | 9/2000 | Betzold |
| 6,270,692 B1 * | 8/2001 | Geissler et al. ............ 252/363.5 |
| 6,306,964 B1 | 10/2001 | Evans |
| 6,387,501 B1 | 5/2002 | McCrary |
| 6,406,789 B1 | 6/2002 | McDaniel |
| 6,528,157 B1 | 3/2003 | Hussain |
| 6,582,819 B2 | 6/2003 | McDaniel |
| 6,632,527 B1 | 10/2003 | McDaniel |
| 6,668,926 B2 | 12/2003 | Nguyen |
| 6,705,400 B1 | 3/2004 | Nguyen |
| 6,866,099 B2 | 3/2005 | Nguyen |
| 7,012,043 B2 | 3/2006 | Klein |
| 7,078,442 B2 | 7/2006 | Brown |
| 7,135,231 B1 | 11/2006 | Sinclair |
| 7,153,575 B2 | 12/2006 | Anderson |
| 7,216,711 B2 | 5/2007 | Nguyen |
| 7,261,156 B2 | 8/2007 | Nguyen |
| 7,270,879 B2 | 9/2007 | McCrary |
| 7,281,581 B2 | 10/2007 | Nguyen |
| 7,318,472 B2 | 1/2008 | Smith |
| 7,318,474 B2 | 1/2008 | Welton |
| 7,322,411 B2 | 1/2008 | Brannon |
| 7,334,635 B2 | 2/2008 | Nguyen |
| 7,343,973 B2 | 3/2008 | Dusterhoft |
| 7,350,571 B2 | 4/2008 | Nguyen |
| 7,407,010 B2 | 8/2008 | Rickman |
| 7,528,096 B2 | 5/2009 | Brannon |
| 7,624,802 B2 | 12/2009 | McCrary |
| 7,726,399 B2 | 6/2010 | Brannon |
| 7,754,659 B2 | 7/2010 | Rediger |
| 7,772,163 B1 | 8/2010 | Brannon |
| 7,789,147 B2 | 9/2010 | Brannon |
| 7,919,183 B2 | 4/2011 | McDaniel |
| 2002/0048676 A1 | 4/2002 | McDaniel |
| 2003/0131998 A1 | 7/2003 | Nguyen |
| 2003/0224165 A1 | 12/2003 | Anderson |
| 2005/0019574 A1 | 1/2005 | McCrary |
| 2007/0021309 A1 | 1/2007 | Bicerano |
| 2007/0161515 A1 | 7/2007 | Bicerano |
| 2007/0204992 A1 | 9/2007 | Davis |
| 2007/0208156 A1 | 9/2007 | Posey |
| 2007/0209794 A1 | 9/2007 | Kaufman |
| 2007/0215354 A1 | 9/2007 | Rickman |
| 2008/0202744 A1 | 8/2008 | Crews |
| 2008/0202750 A1 | 8/2008 | Rediger |
| 2008/0230223 A1 | 9/2008 | McCrary |
| 2009/0238988 A1 | 9/2009 | McDaniel |
| 2010/0065271 A1 | 3/2010 | McCrary |
| 2011/0244125 A1 | 10/2011 | Weisenberg |
| 2011/0272146 A1 | 11/2011 | Green |
| 2011/0297383 A1 | 12/2011 | Tanguay |
| 2012/0018162 A1 | 1/2012 | Tanguay |

OTHER PUBLICATIONS

Wingenfelder, Ulla et al., Removal of Heavy Metals from Mine Waters by Natural Zeolites, Environ. Sci. Technol., 2005, vol. 39, 4606-4613.

Halimoon, Normala, Removal of Heavy Metals from Textile Wastewater Using Zeolite, EnvironmentAsia 3(special issue) 2010, 124-130.

Wikipedia, Methylene diphenyl diisocyanate, http://en.wikipedia.org/wiki/Methylene_diphenyl_diisocyanate.

CARBO Ceramics, Topical Reference, Physical Properties of Proppants, pp. 1-5.

Huntsman, Performance products JEFFCAT catalysts for the Polyurethane Industry—Asia-Pacific, pp. 1-6.

Huntsman, JEFFCAT Amine Catalysts for the Polyurethane Industry—Americas Region.

Sanchez, Mariano, FRAC Packing: Fracturing for Sand Control, Middle East and Asia Reservoir Review, Nov. 8, 2007, pp. 37-49.

Interstate Oil and Gas Compact Commission and All Consulting, A Guide to Practical Management of Produced Water from Onshore Oil and Gas Operations in the United States, Oct. 2006.

Boster, Ronald S., A Study of Ground-Water Contamination Due to Oil-Field Brines in Morrow and Delaware Counties, Ohio, With Emphasis on Detection Utilizing Electrical Resistivity Techniques, The Ohio State University, 1967.

EPA, Oil and Gas Extraction, Compliance and Enforcement History, Sector Notebook Project, Oct. 2000, pp. 115-155.

Huntsman, The JEFFAMINE Polyetheramines, 2007.

* cited by examiner

COATED AND CURED PROPPANTS

RELATED APPLICATIONS

This application is a continuation-in-part of U.S. patent application Ser. No. 13/099,893 entitled "Coated and Cured Proppants" and filed on May 3, 2011 and also a continuation-in-part of U.S. patent application Ser. No. 13/188,530 entitled "Coated and Cured Proppants" and filed on Jul. 22, 2011. The contents of these co-pending application are hereby incorporated by reference.

FIELD OF INVENTION

The invention relates to a method for the production of coated proppants, and also to the proppants obtained according to this method, to the uses thereof and to methods which use the proppants.

BACKGROUND OF THE INVENTION

Well fracturing is an often used technique to increase the efficiency and productivity of oil and gas wells. Overly simplified, the process involves the introduction of a fracturing fluid into the well and the use of fluid pressure to fracture and crack the well strata. The cracks allow the oil and gas to flow more freely from the strata and thereby increase production rates in an efficient manner.

There are many detailed techniques involved in well fracturing, but one of the most important is the use of a solid "proppant" to keep the strata cracks open as oil, gas, water and other fluids found in well flow through those cracks. The proppant is carried into the well with the fracturing fluid which itself may contain a variety of viscosity enhancers, gelation agents, surfactants, etc. These additives also enhance the ability of the fracturing fluid to carry proppant to the desired strata depth and location. The fracturing fluid for a particular well may or may not use the same formulation for each depth in the strata.

Proppants can be made of virtually any generally solid particle that has a sufficiently high crush strength to prop open cracks in a rock strata at great depth and temperatures of about 35° C. and higher. Sand and ceramic proppants have proved to be especially suitable for commercial use.

A proppant that is flushed from the well is said to have a high "flow back." Flow back is undesirable. In addition to closure of the cracks, the flushed proppants are abrasive and can damage or clog the tubular goods used to complete the well, valves and pipelines in downstream processing facilities.

One type of synthetic resin coatings can be used to impart a degree of adhesion to the proppant so that flow back is substantially reduced or eliminated. Such resins can include phenol resin, epoxy resin, polyurethane-phenol resin, furane resin, etc. See published US Patent Application Nos. 2002/0048676, 2003/0131998, 2003/0224165, 2005/0019574, 2007/0161515 and 2008/0230223 as well as U.S. Pat. Nos. 4,920,192; 5,048,608; 5,199,491; 6,406,789; 6,632,527; 7,624,802; and published international application WO 2010/049467, the disclosures of which are herein incorporated by reference.

With some coatings, the synthetic coating is not completely cured when the proppant is introduced into the well. The coated, partially-cured proppants are free flowing, but the coating resin is still slightly reactive. The final cure is intended to occur in situ in the strata fracture at the elevated closure pressures and temperatures found "down hole."

Such partially cured coating can also exhibit a number of performance issues ranging from:

A lack of storage stability if stored in a hot environment. This type of situation could result in a completion of the curing process while in storage making the coated proppant incapable of bonding when placed in the fracture.

Leaching chemicals out of the partially cured coating that could interfere with the viscosity profile of the fluid used to carry the proppant into the fracture or the chemical breaker system that is relied on to reduce the frac fluid viscosity after completion of the fracturing treatment.

Erosion of the partially cured coating when the coated proppant is handled pneumatically in order to place in the field storage bins at the well site.

Premature curing in the fracture due to extended exposure to the elevated temperatures found downhole but before the cracks heal and begin to force the proppant grains into contact with each other.

A second type of synthetic coating is described as being pre-cured or tempered. In this case the coating is essentially cured during the manufacturing process. This type of coating will strengthen the substrate particle so that it can withstand a higher stress level before grain failure. Such a pre-cured coating with also exhibit the following traits: (1) Excellent storage stability; (2) Minimal chemicals that can be leached out of the coating to interfere with carrier fluid viscosity or breaker systems; and (3) A coating that is resilient to the abrasion of pneumatic handling.

The main limitation of a pre-cured coating is that it cannot create significant particle to particle bonding when placed in the fracture and temperature and closure pressure are applied. This means that a pre-cured coated particle can do little to prevent proppant flowback after the well is opened up to start the clean-up process or to produce the well. Such pre-cured products can also exhibit reductions in bonding capability and/or strength if exposed to elevated temperatures during handling or storage.

Proppants based on polyurethane chemistries have a number of potential advantages over phenol resin systems. Most notably, the reaction rates used to make polyurethane coatings are generally faster than phenol resins, cure at lower temperatures and do not have gaseous emissions that require specialized recovery equipment. The coating step with polyurethanes can be carried out at temperatures of about 10° C. to about 250° C. although temperatures of less than about 110° C. are preferred to minimize emissions during the coating process as well as energy use. Polyurethane coatings can also be performed without the use of solvents, whereas many of the known methods, as a rule, require organic solvents for the resinous coating. The components in polyurethane systems are also generally easier to use and pose lower environmental issues. These factors could reduce the cost to make coated proppants.

Previously described polyurethanes have not, however, achieved widespread adoption due to their performance in the hot, wet, high pressured environment encountered in the fracture. The stability of the coating to this environment, the ability of the coating to prevent particle failure (e.g., by crushing) and to develop strong particle-to-particle bonds, have contributed to poor flowback control and less than desirable fracture conductivity.

Low temperature wells pose certain problems for coated proppants. Prior to the present invention, the only option that was available to the oil and gas well industry for controlling flowback in a well having a low formation temperature, e.g., <140° F. (60° C.) was to use a partially cured, phenolic-coated proppant in combination with a type of plasticizer called a bond "activator". Without the bond activator, the phenolic coating cured too slowly to generate sufficient bond strength in a reasonable amount of time. The activator plasticizer softens the coating so that the coating can gain some adhesion properties when the coated proppant solids are pushed into contact due to the closure stress from the closing of the fractured strata cracks. This adhesion will never result in a substantial measurable unconfined compressive strength but can result in a somewhat consolidated sample. The activator would be used at concentrations ranging from 5-20 gallons/1000 gallons of fracturing fluid (known as "frac" fluid). While the activator can help the phenolic coated proppant to function (to some degree) in low temperature applications it does have the following issues:

The activator loadings add substantial cost to the treatment.

The activator chemistry can create problems with frac fluid rheology and breakers systems.

The use of an activator does not result in a significant measurable particle to particle bond strength.

The activator is another factor in trying to quantify the effects of a fracturing treatment on the environment.

The phenolic coating also has environmental issues because of the components that can be leached out of the coating (formaldehyde, phenol and hexamethylenetetramine)

SUMMARY OF THE INVENTION

It would be desirable to develop a coated proppant that combined adequate crush resistance, resistance to dusting when handled pneumatically and the limited leaching of chemicals that is exhibited by pre-cured coatings with the ability to create the particle-to-particle bonds that resist proppant flowback which are exhibited by a partially cured proppant coating. Even more desirably, this bonding ability is relatively unaffected by prolonged exposure to elevated temperatures in the fracture so that the coated proppants continue to bond as stress is applied when the fracture heals and forces the coated proppants together.

It would also be desirable to have a coated proppant that retained its conductivity under the conditions prevailing within an actively producing well field stratum.

It would further be desirable to have a coating that not only exhibited all of these properties but which had desirable fracture conductivity and a short production cycle.

It would be especially preferred if a proppant could be substantially covered with a fast cure coating that could be produced to a free flowing state in a short period, e.g., less than about four minutes, while also exhibiting good crush resistance, resistance to hot water coating loss and low dust generation during pneumatic conveyance.

It would also be desirable to have a coating that would not require the use of an activator in order to generate measurable bond strength at low temperature, that would eliminate the need for an added activator which might affect interactions between the frac fluid and a breaker, and avoid environmental effects from the use of an activator and components that can come out of a phenolic coating on the proppant solids.

These and other objectives of the invention that will become apparent from the description herein can be accomplished by a coating and coating process that comprises the step of: coating a proppant solid with a substantially homogeneous coating mixture that comprises (i) at least one isocyanate-functional component having at least 2 isocyanate groups, and (ii) at least one curing agent comprising a monofunctional alcohol, amine or amide, in an amount sufficient and under conditions sufficient to substantially cure said proppant coating and form free flowing, coated proppants in a period of time of less than about four minutes to form a free-flowing, substantially cured, coated proppant.

A coated, free flowing proppant according to the invention comprises a solid proppant core particle that is substantially covered with a coating that comprises the reaction product of a coating mixture that comprises at least one isocyanate component and a curing agent to form a substantially fully cured proppant coating that is capable of forming particle-to-particle bonds at elevated temperature and pressure, such as those found downhole in an oil or gas well.

The coating process of the present invention results one or more layers of cured polyurethane around a solid proppant core that is substantially cured and crosslinked quickly to produce a coated proppant product that acts like it has a hybrid coating, i.e., one that acts like a pre-cured coating in its resists dissolution of the coating under the rigorous combination of high heat, agitation, abrasion and water found downhole in an oil or gas well; exhibits good crush resistance and fracture conductivity; and has a tough coating that exhibits low levels of dust or fines generation during pneumatic conveyance as well as in use downhole but also exhibits traits of a partially cured coating in its ability to form particle-particle bonds with similarly coated proppants at downhole conditions. In addition, the coating process has a high production rate due to its low cycle time for the coating/curing process, low emission level and a low overall production cost and does not lose bonding capability if exposed to elevated temperatures during handling or storage.

DETAILED DESCRIPTION OF THE INVENTION

Figure 1:
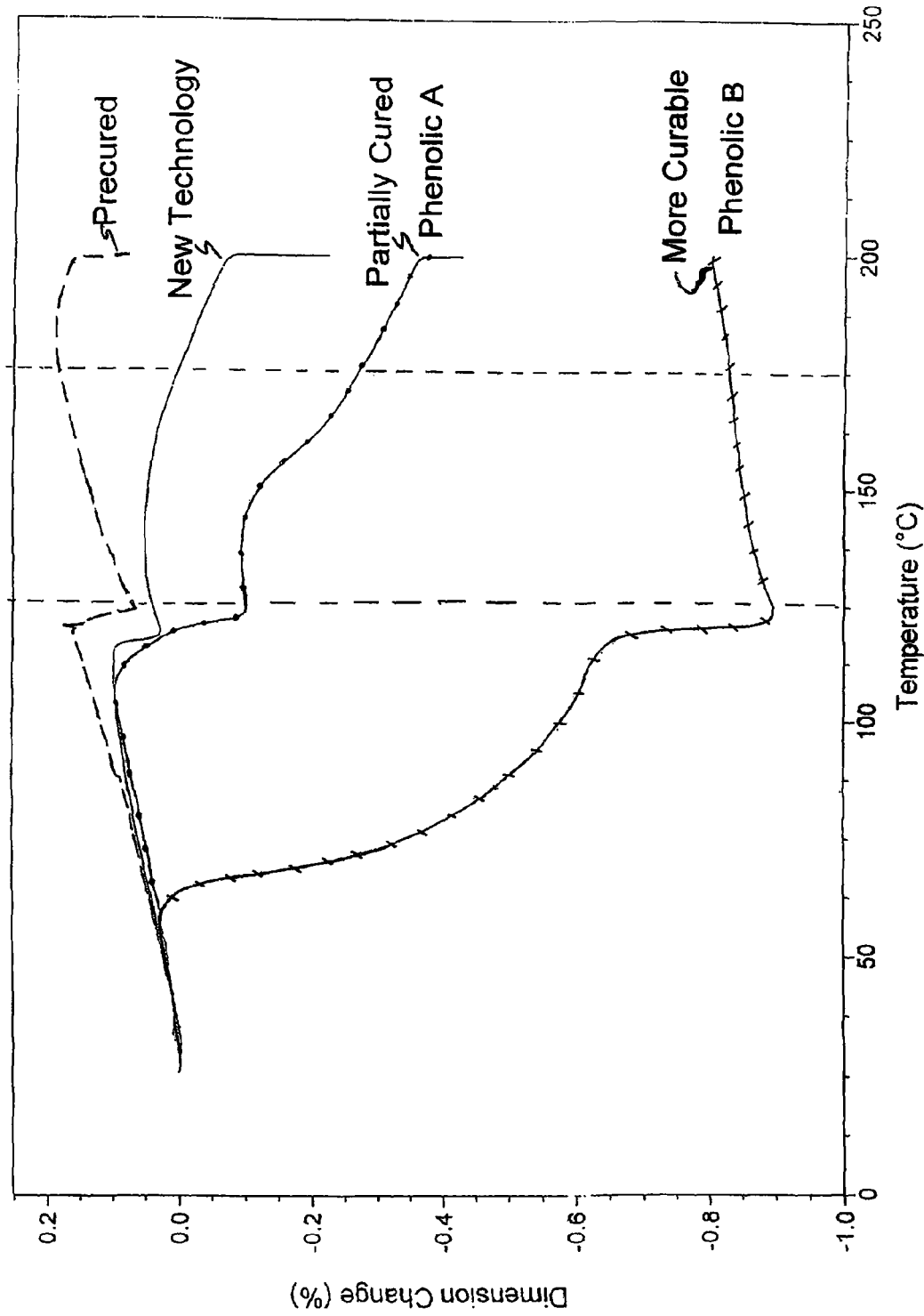
FIG. 1 is a TMA plot of Dimension Change at various Temperatures in a TMA test of pre-cured, partially cured Phenolic A, partially cured Phenolic B that is more curable than Phenolic A, and the coating of the present invention as discussed in Example 6.

The coating formulation of the present invention includes a substantially homogeneous mixture of a curable coating formulation that comprises: (a) at least one isocyanate-functional reactant having at least 2 isocyanate groups, and (ii) at least one curing agent comprising a monofunctional alcohol, amine or amide. The coating formulation may further comprise one or more curing agents in the form of amine reactants, metal catalysts, and/or polyol-functional reactants. The components are used in an amount sufficient and under conditions that are also sufficient to substantially cure the proppant coating and form free flowing, coated proppants in a fairly short period of time. The coated proppant thus exhibits the good handling and low dust characteristics of a pre-cured product but also exhibits in-strata consolidation characteristics and flow-back resistance that are like a partially cured product.

The coating process of the present invention applies one or more layers of a curable coating formulation around a solid proppant core that is quickly and substantially cured to resist dissolution of the coating under the rigorous combination of high heat, agitation, abrasion and water that are found downhole in a well. Preferably, the cured coating exhibits a sufficient resistance to a 10 day autoclave test or 10 day conductivity test so that the coating resists loss by dissolution in hot water of less than 25 wt %, more preferably less than 15 wt %, and even more preferably a loss of less than 5 wt %. The substantially cured coating of the invention thus resists dissolution in the fractured stratum while also exhibiting sufficient particle-to-particle reaction bond strength to resist flow back and sufficiently high crush strength to maintain conductivity of the fractures.

A preferred testing method for the effectiveness of a proppant is described in ISO 13503-5:2006(E) "Procedures for measuring the long term conductivity of proppants", the disclosure of which is herein incorporated by reference. ISO 13503-5:2006 provides standard testing procedures for evaluating proppants used in hydraulic fracturing and gravel packing operations. ISO 13503-5:2006 provides a consistent methodology for testing performed on hydraulic fracturing and/or gravel packing proppants. The "proppants" mentioned henceforth in this part of ISO 13503-5:2006 refer to sand, ceramic media, resin-coated proppants, gravel packing media, and other materials used for hydraulic fracturing and gravel-packing operations. ISO 13503-5:2006 is not applicable for use in obtaining absolute values of proppant pack conductivities under downhole reservoir conditions, but it does serve as a consistent method by which such downhole conditions can be simulated and compared in a laboratory setting.

The present invention is particularly directed to a proppant coating technology that exhibits decidedly different traits when kept dry (as in a storage bin) as opposed to when the coated proppant is added to the frac fluid and pumped into the fracture. One way to characterize this difference is by analyzing the test results from a TMA (thermal mechanical analyzer). In a dry state, the preferred coating will show a Tg softening point that is well above any possible storage temperature (>75° C.). This assures that the coated product can be safely stored as long as it is kept relatively dry. However, when water is added to the TMA test sample, the resulting Tg is now measured at a level that is <50° C. At this Tg, the coated sand will have the necessary properties to promote adhesion at low temperature applications once the fracture has closed and the resulting differential stress is placed on the proppants. Since the coating's ability to bond is not related to a chemical reaction rate, once the fracture has closed thereby exerting a closure stress on the proppant pack, there is no need for an extended shut-in period, e.g., 18-24 hours, before opening the well up to cleanup and production.

The Isocyanate Component

The isocyanate-functional component for the present invention comprises an isocyanate-functional component with at least 2 reactive isocyanate groups. Other isocyanate-containing compounds may be used, if desired. Examples of suitable isocyanate with at least 2 isocyanate groups an aliphatic or an aromatic isocyanate with at least 2 isocyanate groups (e.g. a diisocyanate, triisocyanate or tetraisocyanate), or an oligomer or a polymer thereof can preferably be used.

These isocyanates with at least 2 isocyanate groups can also be carbocyclic or heterocyclic and/or contain one or more heterocyclic groups.

The isocyanate-functional component with at least 2 isocyanate groups is preferably a compound or oligomer of compounds of the formula (III) or a compound of the formula (IV):

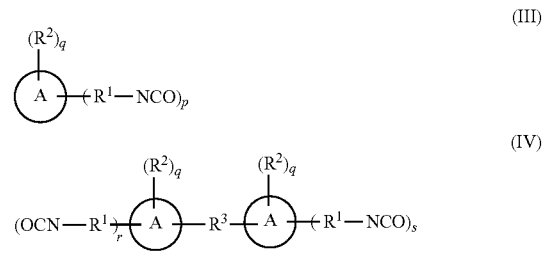

In the formulas (III) and (IV), A is each, independently, an aryl, heteroaryl, cycloalkyl or heterocycloalkyl. Preferably, A is each, independently, an aryl or cycloalkyl. More preferably A is each, independently, an aryl which is preferably phenyl, naphthyl or anthracenyl, and most preferably phenyl. Still more preferably A is a phenyl.

The above mentioned heteroaryl is preferably a heteroaryl with 5 or 6 ring atoms, of which 1, 2 or 3 ring atoms are each, independently, an oxygen, sulfur or nitrogen atom and the other ring atoms are carbon atoms. More preferably the heteroaryl is selected among pyridinyl, thienyl, furyl, pyrrolyl, imidazolyl, pyrazolyl, pyrazinyl, pyrimidinyl, pyridazinyl, oxazolyl, isoxazolyl or furazanyl.

The above mentioned cycloalkyl is preferably a $C_{3-10}$-cycloalkyl, more preferably a $C_{5-7}$-cycloalkyl.

The above mentioned heterocycloalkyl is preferably a heterocycloalkyl with 3 to 10 ring atoms (more preferably with 5 to 7 ring atoms), of which one or more (e.g. 1, 2 or 3) ring atoms are each, independently, an oxygen, sulfur or nitrogen atom and the other ring atoms are carbon atoms. More preferably the heterocycloalkyl is selected from among tetrahydrofuranyl, piperidinyl, piperazinyl, aziridinyl, acetidinyl, pyrrolidinyl, imidazolidinyl, morpholinyl, pyrazolidinyl, tetrahydrothienyl, octahydroquinolinyl, octahydroisoquinolinyl, oxazolidinyl or isoxazolidinyl. Still more preferably, the heterocycloalkyl is selected from among tetrahydrofuranyl, piperidinyl, piperazinyl, pyrrolidinyl, imidazolidinyl, morpholinyl, pyrazolidinyl, tetrahydrothienyl, oxazolidinyl or isoxazolidinyl.

In the formulas (III) and (IV), each $R^1$ is, independently, a covalent bond or $C_{1-4}$-alkylene (e.g. methylene, ethylene, propylene or butylene). Preferably each $R^2$ is hydrogen or a covalent bond.

In the formulas (III) and (IV), each $R^2$ is each, independently, hydrogen, a halogen (e.g. F, Cl, Br or I), a $C_{1-4}$-alkyl (e.g. methyl, ethyl, propyl or butyl) or $C_{1-4}$-alkyoxy (e.g. methoxy, ethoxy, propoxy or butoxy). Preferably, each $R^2$ is, independently, hydrogen or a $C_{1-4}$-alkyl. More preferably each $R^2$ is hydrogen or methyl.

In the formula (IV), $R^3$ is a covalent bond, a $C_{1-4}$-alkylene (e.g. methylene, ethylene, propylene or butylene) or a group —$(CH_2)_{R31}$—O—$(CH_2)_{R32}$—, wherein R31 and R32 are each, independently, 0, 1, 2 or 3. Preferably, $R^3$ is a —$CH_2$— group or an —O— group.

In the formula (III), p is equal to 2, 3 or 4, preferably 2 or 3, more preferably 2.

In the formulas (III) and (IV), each q is, independently, an integer from 0 to 4, preferably 0, 1 or 2. When q is equal to 0, the corresponding group A has no substituent $R^2$, but has hydrogen atoms instead of $R^2$.

In the formula (IV), each r and s are, independently, 0, 1, 2, 3 or 4, wherein the sum of r and s is equal to 2, 3 or 4. Preferably, each r and s are, independently, 0, 1 or 2, wherein the sum of r and s is equal to 2. More preferably, r is equal to 1 and s is equal to 1.

Examples of the isocyanate with at least 2 isocyanate groups are: toluol-2,4-diisocyanate; toluol-2,6-diisocyanate; 1,5-naphthalindiisocyanate; cumol-2,4-diisocyanate; 4-methoxy-1,3-phenyldiisocyanate; 4-chloro-1,3-phenyldiisocyanate; diphenylmethane-4,4-diisocyanate; diphenylmethane-2,4-diisocyanate; diphenylmethane-2,2-diisocyanate; 4-bromo-1,3-phenyldiisocyanate; 4-ethoxy-1,3-phenyldiisocyanate; 2,4'-diisocyanate diphenylether; 5,6-dimethyl-1,3-phenyl-diisocyanate; methylenediphenyl diisocyanate (including 2,2'-MDI, 2,4'-MDI and 4,4"-MDI); 4,4-diisocyanato-diphenylether; 4,6-dimethyl-1,3-phenyldiisocyanate; 9,10-anthracene-diisocyanate; 2,4,6-toluol triisocyanate; 2,4,4'-triisocyanatodiphenylether; 1,4-tetramethylene diisocyanate; 1,6-hexamethylene diisocyanate; 1,10-decamethylenediisocyanate; 1,3-cyclohexylene diisocyanate; 4,4'-methylene-bis-(cyclohexylisocyanate); xylol diisocyanate; 1-isocyanato-3-methyl-isocyanate-3,5,5-trimethylcyclohexane (isophorone diisocyanate); 1-3-bis(isocyanato-1-methylethyl)benzol (m-TMXDI); 1,4-bis(isocyanato-1-methylethyl)benzol (p-TMXDI); oligomers or polymers of the above mentioned isocyanate compounds; or mixtures of two or more of the above mentioned isocyanate compounds or oligomers or polymers thereof.

Particularly preferred isocyanates with at least 2 isocyanate groups are toluol diisocyanate, methylenediphenyl diisocyanate, diphenylmethane diisocyanate, an oligomer based on toluol diisocyanate, an oligomer based on methylenediphenyl diisocyanate (poly-MDI) or an oligomer based on diphenylmethane diisocyanate and polymers thereof.

Curing Agents

The coatings of the invention can be cured with at least one of a variety of curing agents, including reactive, non-reactive (e.g., "catalysts") and partially reactive agents. Generally, preferred curing agents are selected from amine-based curing agents, hydroxyl-functional curing agents, polyols, and/or metal-based catalysts. Particularly preferred curing agents are one or more monofunctional alcohols, amines and/or amides. The amine-based curing agents may also be used as a mixture of a fast-acting first curing agent and a second, latent curing agent. Either of these first and/or second amine-based curing agents may be reactive, nonreactive or partially reactive.

Suitable single amine-based curing agent or a mixture of amine-based curing agents can include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl)ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-benzene; and derivatives thereof; 1,4-bis-(sec-butylamino)-benzene; 1,2-bis-(sec-butylamino)-benzene; N,N'-dialkylamino-diphenylmethane; trimethyleneglycol-ci-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-ciaminocyclohexylmethane; and mixtures thereof. In one embodiment, the amine-terminated curing agent is 4,4'-bis-(sec-butylamino)-dicyclohexylmethane. Preferred amine-based curing agents for use with the present invention include triethylenediamine; bis(2-dimethylaminoethyl)ether; tetramethylethylenediamine; pentamethyldiethylenetriamine; 1,3,5-tris(3-(dimethylamino)propyl)-hexahydro-s-triazine and other tertiary amine products of alkyleneamines.

Additionally, other catalysts that promote the reaction of isocyanates with hydroxyls and amines that are known by the industry can be used in the present invention, e.g., transition metal co-catalysts of Groups III or IV used for polyurethane foams. A particularly preferred metal co-catalyst is a tin complex such as stannous 2-ethylhexanoate or an organotin compound, such as dibutyltin dilaurate and tin-containing salts.

Also preferred are catalysts that promote isocyanate trimerization over other reaction mechanisms. See, e.g., U.S. Pat. No. 5,264,572 (cesium fluoride or tetraalkylammonium fluoride), U.S. Pat. No. 3,817,939 (organic carbonate salt), and U.S. Pat. No. 6,127,308 (lithium salts, lithium hydroxide, allophane catalysts such as tin-2-ethylhexanoate or tin octoate, and organic compounds containing at least one hydroxyl group), the disclosures of which are herein incorporated by reference.

The amine-based curing agent may have a molecular weight of about 64 or greater. In one embodiment, the molecular weight of the amine-curing agent is about 2000 or less. In addition, any of the amine-terminated moieties listed above for use as the isocyanate-reactive component to form the prepolymer may be used as curing agents to react with the prepolymers.

Of the list above, the saturated amine-based curing agents suitable for use with the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; triethanolamine; monoisopropanolamine, diisopropanolamine; triisopropanolamine; isophoronediamine; N,N'-diisopropyl-isophorone diamine and mixtures thereof.

In one embodiment, the curative used with the prepolymer include 3,5-dimethylthio-2,4-toluenediamine,3,5-dimethylthio-2,6-toluenediamine, 4,4'-bis-(sec-butylamino)-diphenylmethane, N,N'-diisopropyl-isophorone diamine; polyoxypropylene diamine; propylene oxide-based triamine; 3,3'-dimethyl-4,4'-diaminocyclohexylmethane; and mixtures thereof.

Because unhindered primary diamines result in a rapid reaction between the isocyanate groups and the amine groups, in certain instances, a hindered secondary diamine may be more suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (CLEAR-LINK 1000® from Huntsman Corporation in The Woodlands, Tex.) may be suitable for use in combination with an isocyanate to form the polyurea prepolymer. In addition, N,N'-diisopropyl-isophorone diamine, also available from Huntsman Corporation, under the tradename JEFFLINK®, may be used as the secondary diamine curing agent.

In addition, a trifunctional curing agent can be used to help improve cross-linking and, thus, to further improve the chemical and/or abrasion resistance of the coating. In one embodiment, a triol such as trimethylolpropane or a tetraol such as N,N,N',N'-tetrakis (2-hydroxylpropyl)ethylenediamine may be added to the formulations.

The curing agents of the present invention can be added to the coating formulation with the polyol component, the amine-reactive polyol component, any of the additives (e.g., coloring agents) or added simultaneously as any of these components or pre-coated on the proppant. Preferably, the curing agent is mixed with or co-applied to the solid proppant core as the first isocyanate and any other reactants are mixed so that the curing process has begun by the time the coating formulation is applied to the surface of the solid proppant core. It is also possible to premix the isocyanate and polyol together immediately before entry into the mixer. This probably would give a slightly more uniform distribution of the chemicals in the coating. Alternately, it would be possible to premix the polyol and curing agent before they are added to the isocyanate.

Most preferably, the isocyanate, polyol, combination of (a) polyol and (b) curing agent or each individually are continuously added to solid proppant in a moving mixer at a rate that is not substantially greater than the rate of the crosslinking reaction between and among the ingredients. The specific rate will depend on the size of the mixer, the type of mixer, and whether batch or continuous production is desired. The goal is to substantially completely coat the proppant solid with a coating that becomes cured in the mixer and is discharged as a free-flowing, discrete particulates. The amperage draw rate of the mixer can be used as a guide in tumbling-type mixers because the build-up of an uncured, tacky coating on the proppant solids will increase the load on the mixer motor which can be monitored by a simple amp meter. Adding the reaction components at a rate that is consistent with the reaction rate of the curing process avoids substantial increases in amperage allows the coating process, avoids stalling the motor or interrupting the coating process, and maximizes the productivity of the equipment used to perform the coating/curing process. In a preferred process using laboratory scale equipment, a few seconds after beginning to add the polyol, the isocyanate is added at a controlled rate over a relatively short period, e.g., about a minute.

Hydroxy-Functional Curing Agents

The proppant coating of the invention may also be cured alone or with other curing agents with a single hydroxy-terminated curing agent (i.e., a monol such as C1-C20 alcohols such as ethanol, isopropyl, butanol, or stearyl alcohol) or a mixture of hydroxy-terminated curing agents. The appropriate use of such a monol capping agent or chain terminator can help to control the impact of internal, unreacted —NCO groups that can have adverse properties on the final coating. Indeed, the use of monol within the range from about 1 equivalent wt % to about 30 equivalent wt % relative to the weight of any added polyhydroxy compounds can bring into the coating certain properties that are not related to the original isocyanate or polyhydroxy component, such as enhanced or decreased hydrophobicity, corrosion resistance, viscosity modification in fracturing fluid, reduce the frictional drag of production fluids once in the fracture, ion exchange and anti-microbial effects.

Suitable hydroxy-terminated curing agents include, but are not limited to, ethanol, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N'N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy] cyclohexane; 1,3-bis-{2-[2-(2-hydroxyethoxy)ethoxy] ethoxy}cyclohexane; polytetramethylene ether glycol, preferably having a molecular weight ranging from about 250 to about 3900; resorcinol-di-(beta-hydroxyethyl)ether and its derivatives; hydroquinone-di-(beta-hydroxyethyl)ether and its derivatives; 1,3-bis-(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; N,N-bis(.beta.-hydroxypropyl)aniline; 2-propanol-1,1'-phenylaminobis; and mixtures thereof.

The hydroxy-terminated curing agent may have a molecular weight of at least about 50. In one embodiment, the molecular weight of the hydroxy-terminated curing agent is about 2000 or less. In yet another embodiment, the hydroxy-terminated curing agent has a molecular weight of about 250 to about 3900. It should be understood that molecular weight, as used herein, is the absolute weight average molecular weight and would be understood as such by one of ordinary skill in the art.

The saturated hydroxy-terminated curing agents, included in the list above, are preferred when making a light stable composition. Those saturated hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; polytetramethylene ether glycol having molecular weight ranging from about 250 to about 3900; and mixtures thereof.

The amount of curing agent that is added to the coating will generally fall within the range from about 0.01 wt % to about 95 wt % of the complete coating formulation.

Polyol Curing Agents

A polyol component can be added to the coating formulation. The polyol component may or may not have reactive amine functionality and can comprise oxides, polyesters, polyamides, polyurethane, epoxy, silicone or polysiloxane, or vinyl backbones which react to become an integral part of the resulting coating on the proppant core.

A useful polyurethane coating is a phenolic polyurethane made with a phenolic polyol according to a patent application that was filed with the German Patent Office under no. DE 10 2010 051 817.4 on Nov. 19, 2010 and entitled "Proppant Coating Technology", the disclosure of which is herein incorporated by reference and summarized below in the context of the process of the present invention.

Another polyol component for the present process comprises a phenol resin that comprises a condensation product of a phenol and an aldehyde, such as formaldehyde. The phenol resin is preferably a resole or novolak phenol resin and more preferably a benzyl ether resin.

The resole-type phenol resin can be obtained, for example, by condensation of phenol or of one or more compounds of the following formula (I), with aldehydes, preferably formaldehyde, under basic conditions.

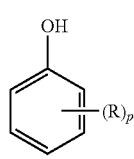
(I)

In the formula (I):
"R" is in each case, independently, a hydrogen atom, a halogen atom, $C_{1-16}$-alkyl (preferably $C_{1-12}$-alkyl, more preferably $C_{1-6}$-alkyl, and still more preferably methyl, ethyl, propyl or butyl) or —OH;
"p" is an integer from 0 to 4, preferably 0, 1, 2 or 3, and more preferably 1 or 2. Those in the art will understand that when p is 0, the compound of formula (I) is phenol.

Novolak-type phenol resin for the present invention comprises the condensation product of phenol or of one or more compounds of the formula (I) defined above, with aldehydes, preferably formaldehyde, under acidic conditions.

In another preferred embodiment, the phenol resin is a benzyl ether resin of the general formula (II):

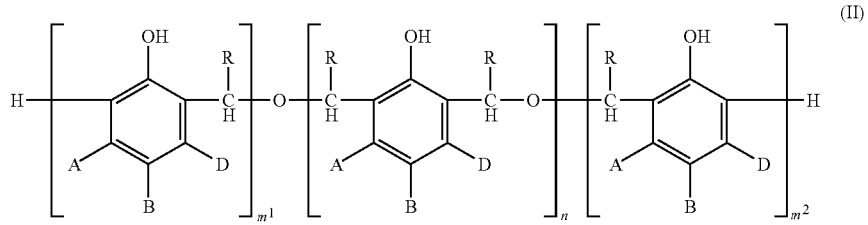
(II)

In the formula (II):
A, B and D each are, independently, a hydrogen atom, a halogen atom, a $C_{1-16}$-hydrocarbon residue, —($C_{1-16}$-alkylene)-OH, —OH, an —O—($C_{1-16}$-hydrocarbon residue), phenyl, —($C_{1-6}$-alkylene)-phenyl, or —($C_{1-6}$-alkylene)-phenylene-OH;
The halogen atom is F, Cl, Br or I;
The $C_{1-16}$-hydrocarbon-residue is preferably $C_{1-16}$-alkyl, $C_{2-16}$-alkenyl or $C_{2-16}$-alkinyl, more preferably $C_{1-12}$-alkyl, $C_{2-12}$-alkenyl or $C_{2-12}$-alkinyl, still more preferably $C_{1-6}$-alkyl, $C_{2-6}$-alkenyl or $C_{2-6}$-alkinyl, and still more preferably $C_{1-4}$-alkyl, $C_{2-4}$-alkenyl or $C_{2-4}$-alkinyl, and still more preferably $C_{1-12}$-alkyl, and still more preferably $C_{1-6}$-alkyl, and still more preferably methyl, ethyl, propyl or butyl, and most preferably methyl;

The residue —($C_{1-16}$-alkylene)-OH is preferably —($C_{1-12}$-alkylene)-OH, more preferably —($C_{1-6}$-alkylene)-OH, and still more preferably —($C_{1-4}$-alkylene)-OH, and most preferably a methylol group (—$CH_2$—OH);

The —O—($C_{1-16}$-hydrocarbon)-residue is preferably $C_{1-16}$-alkoxy, more preferably $C_{1-12}$-alkoxy, and still more preferably $C_{1-6}$-alkoxy, and still more preferably $C_{1-4}$-alkoxy, and still more preferably —O—$CH_3$, —O—$CH_2CH_3$, —O—$(CH_2)_2CH_3$ or —O—$(CH_2)_3CH_3$;

The residue —($C_{1-6}$-alkylene)-phenyl is preferably —($C_{1-4}$-alkylene)-phenyl, and more preferably —$CH_2$-phenyl;

The residue —($C_{1-6}$-alkylene)-phenylene-OH is preferably —($C_{1-4}$-alkylene)-phenylene-OH, and more preferably —$CH_2$-phenylene-OH;

R is a hydrogen atom of a $C_{1-6}$-hydrocarbon residue (e.g. linear or branched $C_{1-6}$-alkyl). R is particularly preferred as a hydrogen atom. This is the case, for example, when formaldehyde is used as aldehyde component in a condensation reaction with phenols in order to produce the benzyl ether resin of the formula (II);

$m^1$ and $m^2$ are each, independently, 0 or 1.

n is an integer from 0 to 100, preferably an integer from 1 to 50, more preferably from 2 to 10, and still more preferably from 2 to 5; and wherein the sum of n, $m^1$ and $m^2$ is at least 2.

In a still further embodiment, the polyol component is a phenol resin with monomer units based on cardol and/or cardanol. Cardol and cardanol are produced from cashew nut oil which is obtained from the seeds of the cashew nut tree. Cashew nut oil consists of about 90% anacardic acid and about 10% cardol. By heat treatment in an acid environment, a mixture of cardol and cardanol is obtained by decarboxylation of the anacardic acid. Cardol and cardanol have the structures shown below:

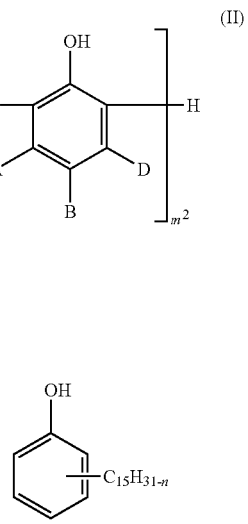

n = 0,2,4,6
Cardanol

-continued

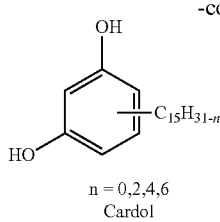

n = 0,2,4,6
Cardol

As shown in the illustration above, the hydrocarbon residue ($-C_{15}H_{31-n}$) in cardol and/or in cardanol can have one (n=2), two (n=4) or three (n=6) double bonds. Cardol specifically refers to compound CAS-No. 57486-25-6 and cardanol specifically to compound CAS-No. 37330-39-5.

Cardol and cardanol can each be used alone or at any particular mixing ratio in the phenol resin. Decarboxylated cashew nut oil can also be used.

Cardol and/or cardanol can be condensed into the above described phenol resins, for example, into the resole- or novolak-type phenol resins. For this purpose, cardol and/or cardanol can be condensed e.g. with phenol or with one or more of the above defined compounds of the formula (I), and also with aldehydes, preferably formaldehyde.

The amount of cardol and/or cardanol which is condensed in the phenol resin is not particularly restricted and preferably is from about 1 wt % to about 99 wt %, more preferably about 5 wt % to about 60 wt %, and still more preferably about 10 wt % to about 30 wt %, relative to 100 wt % of the amount of phenolic starting products used in the phenol resin.

In another embodiment, the polyol component is a phenol resin obtained by condensation of cardol and/or cardanol with aldehydes, preferably formaldehyde.

A phenol resin which contains monomer units based on cardol and/or cardanol as described above, or which can be obtained by condensation of cardol and/or cardanol with aldehydes, has a particularly low viscosity and can thus preferably be employed with a low addition or without addition of reactive thinners. Moreover, this kind of long-chain, substituted phenol resin is comparatively hydrophobic, which results in a favorable shelf life of the coated proppants obtained by the method according to the present invention. In addition, a phenol resin of this kind is also advantageous because cardol and cardanol are renewable raw materials.

Apart from the phenol resin, the polyol component can still contain other compounds containing hydroxyl groups. The other compounds containing hydroxyl groups can be selected from the compounds containing hydroxyl groups that are known to be useful for making polyurethanes, e.g., hydroxy-functional polyethers, hydroxy-functional polyesters, alcohols or glycols. One preferred compound containing hydroxyl groups is, for instance, castor oil. Compounds containing hydroxyl groups such as alcohols or glycols, in particular cardol and/or cardanol, can be used as reactive thinners.

The amount of the other compounds containing hydroxyl groups depends on the desired properties of the proppant coating and can suitably be selected by the person skilled in the art. Typical amounts of compounds containing hydroxyl groups are in the range of between about 10 wt % and about 80 wt %, preferably from about 20 wt % to about 70 wt %, relative to 100 wt % of the polyol component.

The process of the present invention is particularly useful when the proppants are coated with a condensation reaction product that has been made with an excess of isocyanate component with respect to the polyol or curing agent component. In step (a) therefore, 100 parts by weight of the polyol component is used with about 100 to about 600, preferably about 210 to about 530, more preferably about 220 to about 420, and still more preferably about 230 to about 400 parts by weight of the isocyanate base value. Ratios of iso:polyol from about 10:90 to as low as 100:0 are usable depending on the equipment, conditions and production rate provided that the coating and reaction are completed during the coating process. The preferred range of iso:polyol is generally within the range from about 10:90 to about 90:10.

The isocyanate base value defines the amount of the isocyanate component which is equivalent to 100 parts by weight of the polyol component. The NCO-content (%) of the isocyanate component is defined herein according to DIN ISO 53185. To determine the OH— content (%) of the polyol component, first the so-called OH-number is determined in mg KOH/g according to DIN ISO 53240 and this value is divided by 33, in order to determine the OH— content. Thus, in step (a) an excess of NCO-groups in the isocyanate component of between about 100 and about 500%, preferably about 110 to about 430%, more preferably about 120% to about 320%, and still more preferably about 130% to about 300%, relative to the OH-groups in the polyol component is used.

Moreover, in step (a) one or more additives can be mixed with the proppant, the polyol component and the isocyanate component. These additives are not particularly restricted and can be selected from the additives known in the specific field of coated proppants. Provided that one of these additives has hydroxyl, amine or amide functional groups, it should be considered as a different reactive group-containing compound, as described above in connection with the polyol component. If one of the additives has isocyanate groups, it should be considered as a different isocyanate-group-containing compound. Additives with hydroxyl groups and isocyanate groups can be simultaneously considered as different hydroxyl-group-containing compounds and as different isocyanate-group-containing compounds.

Reactive Amines or Amides

The coating formulation of the present invention also optionally includes a reactive amine or reactive amide component, preferably an amine-terminated compound or an amide. The coating formulation can, however, be made effectively and with good properties in the absence or substantial absence of a reactive amine component apart from the reactive polyol and isocyanate components. The reactive amine component can enhance crosslink density within the coating and, depending on component selection, can provide additional characteristics of benefit to the cured coating. Reactive amine components for use in the present invention include C1-C40 amine-terminated, amine-containing, or amide compounds such as monoamines (e.g., butyl amine), amides (e.g., fatty acid amides, stearyl amides), diamines, triamines, amine-terminated glycols such as the amine-terminated polyalkylene glycols sold commercially under the trade name JEFFAMINE from Huntsman Performance Products in The Woodlands, Tex. The use of amides can be particularly useful for enhancing flow and hydrophobic properties as well as the antimicrobial properties of the coatings.

Suitable diamines include primary, secondary and higher polyamines and amine-terminated compounds. Suitable compounds include, but are not limited to, ethylene diamine; propylenediamine; butanediamine; hexamethylenediamine; 1,2-diaminopropane; 1,4-diaminobutane; 1,3-diaminopentane; 1,6-diaminohexane; 2,5-diamino-2,5-dimethylhexane; 2,2,4- and/or 2,4,4-trimethyl-1,6-diaminohexane; 1,11-diaminoundecane; 1,12-diaminododecane; 1,3- and/or 1,4-cyclohexane diamine; 1-amino-3,3,5-trimethyl-5-aminomethyl-cyclohexane; 2,4- and/or 2,6-hexahydrotoluoylene diamine; 2,4' and/or 4,4'-diaminodicyclohexyl methane and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines (also referred to herein as amine terminated polyethers).

Mixtures of polyamines may also be employed in preparing aspartic esters, which is a secondary amine derived from a primary polyamine and a dialkyl maleic or fumaric acid ester, for use in the invention. Representative examples of useful maleic acid esters include dimethyl maleate, diethyl maleate, dibutyl maleate, dioctyl maleate, mixtures thereof and homologs thereof.

Suitable triamines and higher multifunctional polyamines for use in the present coating include diethylene triamine, triethylenetetramine, and higher homologs of this series.

JEFFAMINE diamines include the D, ED, and EDR series products. The D signifies a diamine, ED signifies a diamine with a predominately polyethylene glycol (PEG) backbone, and EDR designates a highly reactive, PEG based diamine.

JEFFAMINE D series products are amine terminated polypropylene glycols with the following representative structure:

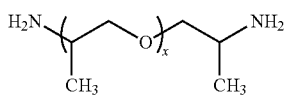

| JEFFAMINE ® | x | MW* |
|---|---|---|
| D-230 | ~2.5 | 230 |
| D-400 | ~6.1 | 430 |
| D-2000 | ~33 | 2,000 |
| D-4000 (XTJ-510) | ~68 | 4,000 |

JEFFAMINE EDR-148 (XTJ-504) and JEFFAMINE EDR-176 (XTJ-590) amines are much more reactive than the other JEFFAMINE diamines and triamines. They are represented by the following structure:

| JEFFAMINE ® | y | x + z | MW* |
|---|---|---|---|
| HK-511 | 2.0 | ~1.2 | 220 |
| ED-600 (XTJ-500) | ~9.0 | ~3.6 | 600 |
| ED-900 (XTJ-501) | ~12.5 | ~6.0 | 900 |
| ED-2003 (XTJ-502) | ~39 | ~6.0 | 2,000 |

JEFFAMINE T series products are triamines prepared by reaction of propylene oxide (PO) with a triol intiator followed by amination of the terminal hydroxyl groups. They are exemplified by the following structure:

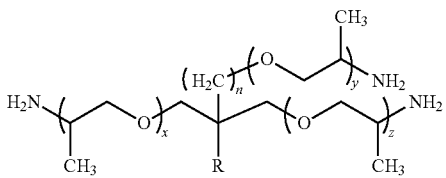

| JEFFAMINE ® | R | n | Moles PO (x + y + z) | MW* |
|---|---|---|---|---|
| T-403 | C$_2$H$_5$ | 1 | 5-6 | 440 |
| T-3000 (XTJ-509) | H | 0 | 50 | 3000 |
| T-5000 | H | 0 | 85 | 5000 |

The SD Series and ST Series products consist of secondary amine versions of the JEFFAMINE core products. The SD signifies a secondary diamine and ST signifies a secondary trimine. The amine end-groups are reacted with a ketone (e.g. acetone) and reduced to create hindered secondary amine end groups represented by the following terminal structure:

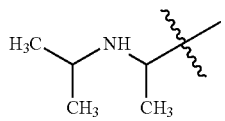

One reactive hydrogen on each end group provides for more selective reactivity and makes these secondary di- and triamines useful for intermediate synthesis and intrinsically slower reactivity compared with the primary JEFFAMINE amines.

| JEFFAMINE ® | Base Product | MW* |
|---|---|---|
| SD-231 (XTJ-584) | D-230 | 315 |
| SD-401 (XTJ-585) | D-400 | 515 |
| SD-2001 (XTJ-576) | D-2000 | 2050 |
| ST-404 (XTJ-586) | T-403 | 565 |

See also U.S. Pat. Nos. 6,093,496; 6,306,964; 5,721,315; 7,012,043; and Publication U.S. Patent Application No. 2007/0208156 the disclosures of which are hereby incorporated by reference.

Additionally, the amine containing compound can be monofunctional as primary amines and amides, each capable of incorporating desirable properties into the coating, e.g., hydrophobic characteristics, better flow properties and antimicrobial properties.

Additives

The proppant coating compositions of the invention may also include various additives. For example, the coatings of the invention may also include pigments, tints, dyes, and fillers in an amount to provide visible coloration in the coatings. Other materials include, but are not limited to, reaction enhancers or catalysts, crosslinking agents, optical brighteners, propylene carbonates, coloring agents, fluorescent agents, whitening agents, UV absorbers, hindered amine light stabilizers, defoaming agents, processing aids, mica, talc, nano-fillers, silane coupling agents, antislip agents, water affinity or repulsion components, impact modifiers, water-activated catalysts, viscosifiers, flowaids, anticaking agents, wetting agents, toughening agents such as one or more block copolymers, and components that act to remove at least some portion of the heavy metals and/or undesirable solutes found in subterranean groundwater. See, copending U.S. patent application Ser. No. 13/224,726 filed on 1 Sep. 2011 entitled "Dual Function Proppants", the disclosure of which is herein incorporated by reference. The additives are preferably present in an amount of about 15 weight percent or less. In one embodiment, the additive is present in a non-zero amount of about 5 percent or less by weight of the coating composition. Especially preferred are amorphous silica (e.g., silica flour, fumed silica and silica dispersions) and silica alternatives (such as those used in sandblasting as an alternative to silica or organofunctional silane like the DYNASYLAN fluids from Evonik Degussa Corporation in Chester, Pa.) that act as anticaking agents or dispersions that are applied to the outer surfaces of the coated proppant solid to prevent the formation of agglomerates during packing and shipping. Applied amounts of the amorphous silica are generally within the range from about 0.001 wt % to about 1 wt % based on the dry proppant weight.

Other additives can include, for example, solvents, softeners, surface-active agents, molecular sieves for removing the reaction water, thinners and/or adhesion agents can be used. Silanes are a particularly preferred type of adhesion agent that improves the affinity of the coating resin for the surface of the proppant. Silanes can be mixed in as additives in step (a), but can also be converted chemically with reactive constituents of the polyol component or of the isocyanate component. Functional silanes such as amino-silanes, epoxy-, aryl- or vinyl silanes are commercially available and, as described above, can be used as additives or can be converted with the reactive constituents of the polyol component or of the isocyanate component. In particular, amino-silanes and epoxy-silanes can be easily converted with the isocyanate component.

An optional additional additive is a contaminant removal component that will remove, sequester, chelate or otherwise clean at least one contaminant, especially dissolved or otherwise ionic forms of heavy metals and naturally occurring radioactive materials (NORMS), from subterranean water or hydrocarbon deposits within a fractured stratum while also propping open cracks in said fractured stratum. Preferably, the contaminant removal component is associated with the proppant solid as a chemically distinct solid that is introduced together with the proppant solid as: (a) an insoluble solid secured to the outer or inner surface of the proppant solid with a coating formulation that binds the solids together, (b) as a solid lodged within pores of the proppant solid or (c) as a chemical compound or moiety that is mixed into or integrated with a coating or the structure of the proppant solid. See copending U.S. patent application Ser. No. 13/224,726 filed on 2 Sep. 2011 entitled "Dual Function Proppants" the disclosure of which is herein incorporated by reference. Additional added functionality can also be in the form of frac fluid breakers, demulsifiers, and bactericides.

The added functionality of an auxiliary particle to the proppant may also be in the form of an ion exchange resin that is pretreated or which itself constitutes a dissolvable solid for the slow release of corrosion or scale inhibitors. Such slow release materials could prove beneficial and advantageous to the overall operation and maintenance of the well.

Proppant Core Solids

The proppants can be virtually any small solid with an adequate crush strength and lack of chemical reactivity. Suitable examples include sand, ceramic particles (for instance, aluminum oxide, silicon dioxide, titanium dioxide, zinc oxide, zirconium dioxide, cerium dioxide, manganese dioxide, iron oxide, calcium oxide, magnesium oxide, or bauxite), or also other granular materials.

Proppant sands are a preferred type of proppant for the present invention. Sand is mainly used in the hydraulic fracturing process of natural gas and oil wells to increase their productivity of valuable natural resources. Proppant sand is monocrystalline with a high silica content of at least 80 wt %, and more typically greater than about 97 wt % silica.

American Petroleum Institute specifications place the following limitations on sieve distribution for proppants suitable for use in a fracture:

At least 90% of material must fall between the two mesh sizes,

No more than 10% of the material may be coarser than the largest mesh size,

No more than 0.1% of the material may be coarser than the next largest mesh size [e.g. for 20/40, up to 10% of the proppant may be between 16 and 20 mesh, but no more than 0.1% can exceed 16 mesh], and No more than 1% of material is permitted to fall onto the pan.

According to bulk density, proppant is divided into: low-density, medium density, high-density. According to the anti-crushing strength, proppant is divided into 52 Mpa, 69 Mpa, 86 Mpa and 103 Mpa four series. Specifications of proppant sand are generally: 12-18 mesh, 12-20 mesh, 16-20 mesh, 16-30 mesh, 20-40 mesh between 30-50 mesh, 40-60 mesh, 40-70 mesh and smaller. The proppants to be coated preferably have an average particle size within the range from about 50 μm and about 3000 μm, and more preferably within the range from about 100 μm to about 2000 μm.

Coating Method

The method for the production of coated proppants according to the present invention can be implemented without the use of solvents. Accordingly, the mixture obtained in step (a) in one embodiment of the method is solvent-free, or is essentially solvent-free. The mixture is essentially solvent-free, if it contains less than 20 wt %, preferably less than 10 wt %, more preferably less than 5 wt %, and still more preferably less than 3 wt %, and most preferably less than 1 wt % of solvent, relative to the total mass of components of the mixture.

Preferably, the method is implemented without the use of organic solvents. In this case, the mixture obtained in step (a) is free of organic solvents, or is essentially free of organic solvents. The mixture is essentially free of organic solvents, if it contains less than 20 wt %, preferably less than 10 wt %, more preferably less than 5 wt %, and still more preferably less than 3 wt %, and most preferably less than 1 wt % of solvent, relative to the total mass of components of the mixture.

In step (a) the proppant is preferably heated to an elevated temperature and then contacted with the coating components. Preferably, the proppant is heated to a temperature within the range of about 50° C. to about 150° C. to accelerate crosslinking reactions in the applied coating.

The temperature of the coating process is not particularly restricted outside of practical concerns for safety and component integrity. The preferred conditions for the coating/curing step of the present invention are generally at conditions within the range of about 50° to about 175° C., more preferably at a temperature within the range from about 75° C. to about 150° C., and most preferably at a temperature within the range from about 80° C. to about 135° C. This temperature avoids a number of emissions issues, reduces the amount of energy consumed in the coating process and also reduces the cooling time for the coated proppants for further handling and packaging.

The mixer used for the coating process is not particularly restricted and can be selected from among the mixers known in the specific field. For example, a pug mill mixer, agitation mixer, drum mixer, plate-type mixer, tubular mixer, trough mixer or conical mixer can be used. The easiest way is mixing in a rotating drum. As continuous mixer, a worm gear can, for example, be used.

Mixing can be carried out on a continuous or discontinuous basis. In suitable mixers it is possible, for example, to add adhesion agents, isocyanate, amine and optional ingredients continuously to the heated proppants. For example, isocyanate components, amine reactant and optional additives can be mixed with the proppant solids in a continuous mixer (such as a worm gear) in one or more steps to make one or more layers of cured coating.

Preferably, the proppant, isocyanate component, curing agent, amine reactant, polyol, and optional additives are mixed homogeneously. Thus, the isocyanate component and amine reactant are distributed uniformly on the surface of the proppants. The coating ingredients are preferably kept in motion throughout the entire mixing process.

It is also possible to arrange several mixers in parallel, series, or serially in several runs in one mixer.

Importantly, the time, temperature, chemistry and reaction rate of the coating/curing process can be combined in proportions that will affect performance characteristics of the resulting cured coating. Preferably, an isocyanate-containing component is used in an amount within the range from about 100 wt % to about 400 wt % based on a reactive polyol-containing component in the curable coating mixture. Lower proportions of excess isocyanate can be used to move the curing process towards substantially complete reaction of all of the —NCO groups within the applied proppant coating by the time the product is discharged as a free-flowing solid. The lower amount of isocyanate-containing component tend to add more thermoplastic properties to the coating for better performance in low temperature applications. Preferably, the proppant coating is cured to an amount less than about 10 wt % of reactive —NCO groups based on the originally applied weight of the proppant coating. The most preferred low temperature proppants according to the invention contain have a weight ratio of isocyanate-functional component that is within the range from about 100-175 wt % of the polyol-functional component with a low coating loss under simulated downhole testing conditions.

Having more unreacted —NCO groups can be useful to develop more thermoset characteristics in the coating thereby making the proppant better suited for high temperature applications. In such a case, a higher amount of isocyanate is used. The preferred high temperature product contains about 200-400% by weight of isocyanate-functional component to polyol-functional component and exhibits a coating loss of less than about 2% in simulated downhole testing conditions.

The coating is preferably performed at the same time as the curing of the coating on the proppant. In the present invention, the coated proppant becomes free-flowing at a time of less than 5 minutes, preferably within the range of 1-4 minutes, more preferably within the range of 1-3 minutes, and most preferably within the range of 1-2.5 minutes to form a coated, substantially cured, free-flowing, coated proppant. This short cycle time combines with the relatively moderate coating temperatures to form a coating/curing process that provides lower energy costs, smaller equipment, reduced emissions from the process and the associated scrubbing equipment, and overall increased production for the coating facility.

The coating material may be applied in more than one layer. In this case, the coating process is repeated as necessary (e.g. 1-5 times, 2-4 times or 2-3 times) to obtain the desired coating thickness. A typical size range for coated proppant is typically within the range of about 16 to about 100 mesh.

The amount of coating resin, that is, of the polyurethane resin applied to a proppant, is preferably between about 0.5 and about 10 wt %, more preferably between about 1% and about 5 wt %, resin relative to the mass of the proppant as 100 wt %. With the method according to the present invention proppants can be coated at temperatures between about 10° C. and about 150° C. and preferably in a solvent-free manner. The coating process requires a comparatively little equipment and if necessary can also be carried out near the sand or ceramic substrate source, near the geographically location of the producing field or at/near the well itself.

The coated proppants can additionally be treated with surface-active agents, anticaking agents, or auxiliaries, such as talcum powder or stearate or other processing aids such as fine amorphous silica to improve pourability, wettability (even to the extent that a water wetting surfactant can be eliminated), dispersability, reduced static charge, dusting tendencies and storage properties of the coated product.

If desired, the coated proppants can be baked or heated for a period of time sufficient to further enhance the ultimate performance of the coated particles and further react the available isocyanate, hydroxyl and reactive amine groups that might remain in the coated proppant. Such a post-coating cure may occur even if additional contact time with a catalyst is used after a first coating layer or between layers. Typically, the post-coating cure step is performed like a baking step at a temperature within the range from about 100°-200° C. for a time of about 1 minute to 4 hours, preferably the temperature is about 125°-200° C. for −1-30 minutes.

Even more preferably, the coated proppant is cured for a time and under conditions sufficient to produce a coated proppant that exhibits a loss of coating of less than 25 wt %, preferably less than 15 wt %, and even more preferably less than 5 wt % when tested according to simulated downhole conditions under ISO 13503-5:2006(E). Even more preferably, the coated proppant exhibits the low dust and handling characteristics of a pre-cured proppant (see API RP 60) but also exhibits a crush test result at 10,000 psi of less than 2%, more preferably less than 1.5%, and especially less than 1%. The coated proppants of the invention preferably also have an unconfined compressive strength of greater than 100 psi and more preferably more than 500 psi with a fracture conductivity at a given closure stress that is substantially equal to, or greater than, the conductivity of a phenolic coating used in the same product application range.

Using the Coated Proppants

The invention also includes the use of the coated proppants in conjunction with a fracturing liquid to increase the production of petroleum or natural gas. Techniques for fracturing an unconsolidated formation that include injection of consolidating fluids are also well known in the art. See U.S. Pat. No. 6,732,800 the disclosure of which is herein incorporated by reference. Generally speaking, a fluid is injected through the wellbore into the formation at a pressure less than the fracturing pressure of the formation. The volume of consolidating fluid to be injected into the formation is a function of the formation pore volume to be treated and the ability of the consolidating fluid to penetrate the formation and can be readily determined by one of ordinary skill in the art. As a guideline, the formation volume to be treated relates to the height of the desired treated zone and the desired depth of penetration, and the depth of penetration is preferably at least about 30 cm radially into the formation. Please note that since the consolidation fluid is injected through the perforations, the treated zone actually stems from the aligned perforations.

Before consolidating the formation, according to a preferred embodiment, an acid treatment is performed by injection of an acidic fluid. As it is well known in the art, this acidic treatment typically includes several stages such as an acid preflush, one or more stages of acid injection and an overflush.

After the perforation and the consolidation, the final step is the fracturing step. Although a resin treatment alone may have been sufficient in preventing early sand production the resin reduces the permeability of the formation around the wellbore. The primary purpose of the fracture treatment is to connect the wellbore to the formation and in doing so by pass any damage and act as a filter allowing the production of hydrocarbons while holding back formation material. The high surface area associated with a fracture makes it a very effective filter, for example, a 13.7 m fracture length with 25 cm height has a surface area of 368 m$^2$, compared to the open hole flow area for a gravel pack of 3.2 m$^2$ with the same zone height.

Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. In order to maintain the fractures formed in the formation after the release of the fluid pressure, the fracturing fluid carries a proppant whose purpose is to prevent the fracturing from closing after pumping has been completed.

The fracturing liquid is not particularly restricted and can be selected from among the frac liquids known in the specific field. Suitable fracturing liquids are described, for example, in W C Lyons, G J Plisga, *Standard Handbook Of Petroleum And Natural Gas Engineering*, Gulf Professional Publishing (2005). The fracturing liquid can be, for example, water gelled with polymers, an oil-in-water emulsion gelled with polymers, or a water-in-oil emulsion gelled with polymers. In one preferred embodiment, the fracturing liquid comprises the following constituents in the indicated proportions: 10001 water, 20 kg potassium chloride, 0.120 kg sodium acetate, 3.6 kg guar gum (water-soluble polymer), sodium hydroxide (as needed) to adjust a pH-value from 9 to 11, 0.120 kg sodium thiosulfate, 0.180 kg ammonium persulfate and optionally a crosslinker such as sodium borate or a combination of sodium borate and boric acid to enhance viscosity.

In addition, the invention relates to a method for the production of petroleum or natural gas which comprises the injection of the coated proppant into the fractured stratum with the fracturing liquid, i.e., the injection of a fracturing liquid which contains the coated proppant, into a petroleum- or natural gas-bearing rock layer, and/or its introduction into a fracture in the rock layer bearing petroleum or natural gas. The method is not particularly restricted and can be implemented in the manner known in the specific field.

Suitable proppants include, but are not limited to, sand, bauxite, glass beads, and ceramic beads and resin-coated versions of each. The proppant will typically exhibit a size within the range from about 8 to about 100 U.S. Standard Mesh in size. Mixtures of suitable proppants can be used. The concentration of proppant in the fracturing fluid can be any concentration known in the art, and will typically be in the range of about 0.5 to about 20 pounds of proppant added per gallon of clean fluid.

The fracturing fluid can contain an added proppant-retention agent, e.g. a fibrous material, a curable resin coated on the proppant, platelets, deformable particles, or a sticky proppant coating to trap proppant particles in the fracture and prevent their production through the wellbore. Fibers, in concentration that preferably ranges from about 0.1% to about 5.0% by weight of proppant, for example selected from natural organic fibers, synthetic organic fibers, glass fibers, carbon fibers, ceramic fibers, inorganic fibers, metal fibers and mixtures thereof, in combination with curable resin-coated proppants are particularly preferred. The proppant-retention agent is intended to keep proppant solids in the fracture, and the proppant and proppant-retention agent keep formation particles from being produced.

EXAMPLES

Conductivity testing was performed at simulated downhole conditions using the method and procedures found in ISO 13503-5:2006. In such tests, a closure stress is applied across a test unit for 50 hours to allow the proppant sample bed to reach a semi-steady state condition. Initially the pack is allowed something around 16 hours to stabilize at 1000 psi closure stress and the test temperature before elevating the closure stress on the proppant. As the fluid is forced through the proppant bed, the pack width, differential pressure, pressure drop, temperature and flow rates are measured at each stress. Proppant pack permeability and conductivity are then calculated.

Multiple flow rates are used to verify the performance of the transducers, and to determine Darcy flow regime at each stress; an average of the data at these flow rates is reported. The test fluid is 2 wt % potassium chloride substitute solution filtered to 3 μm absolute. The initial conductivity, permeability and width is measured and compared to the final conductivity, permeability and width after each stress period. Stress is applied and maintained using an Isco 260D. Stress is applied at 100 psi/minute.

Width of the proppant pack is determined by assembling the conductivity cell with the Ohio sandstone wafers and shims without the sample proppants. The distance between the width bars that are attached to each end of the conductivity cells are measured at each of the four corners and recorded. The cells are then assembled with the proppant samples. The measurements are made again at the beginning and ending of each stress period. Width is determined by subtracting the average of the zero from the average of each of the stress width values. Conductivity is calculated using Darcy's equation.

$$kW_f = 26.78 \mu Q/(\Delta P) \quad \text{Conductivity;}$$

$$k = 321.4 \mu Q/[(\Delta P)W_f] \quad \text{Permeability;}$$

wherein:

k is the proppant pack permeability, expressed in Darcy's;

$kW_f$ is the proppant pack conductivity, expressed in millidarcy-feet

μ is the viscosity of the test liquid at test temperature, expressed in centipoises;

Q is the flow rate, expressed in cubic centimeters per minute;

ΔP is the differential pressure, expressed in psi;

$W_f$ is proppant pack width, expressed in inches.

Sieve analysis is performed using the procedure found in ISO 13503-2 "Measurements of proppants used in hydraulic fracturing and gravel pack operations" Standard US mesh screens are used to separate the sample by size. Not more than 0.1% should be greater than the first specified sieve and not more than 1% should be retained in the pan. There should be at least 90% retained in the specified screens.

To determine the magnitude of coating loss during the conductivity test, samples of the proppant pack are taken, dried in an oven and weighed. They are then subjected to a temperature of 960° C. for 2.5 hours. At the end of this period the samples are cooled and weighed again. The difference between the sample weight after drying but before being subjected to the furnace compared to the sample weight after the time in the furnace, equates to the coating weight. Comparing this number to the same test performed on a sample of the coated material before being subjected to the conductivity test, will equate to the coating weight lost due to the long term exposure to the conditions of the conductivity tests.

The procedure used in an autoclave test would be as follows:

The autoclave test utilizes what amounts to a pressure cooker to subject the coated sands to a hot wet environment that is above the boiling temperature of water. Approximately 20 g of sample is placed in a jar along with 150 ml of distilled water. The lids are placed on sample jars but not tightened. The samples are placed in the autoclave and the chamber is sealed. Heat is applied until the autoclave temperature reaches 250-265° F. (121°-129° C.). The samples are maintained under these conditions for the ten day period. At the end of the test period the autoclave is cooled down, opened and the sample jars removed. Each sample is washed with distilled water and then placed in an oven to dry. The dried samples are then put through a standard test for determination of coating loss. This result is compared to the results of a coating test that was run on the original sample. The difference in coating weight before and after the autoclave test, quantifies the amount of coating that was dissolved by the exposure to a hot water environment.

Example 1

Ten pounds of Minnesota 40/70 fracturing sand is heated to 200° F. in a laboratory mixer at which point the following components are added in the sequence and timing as given below in Tables 1 and 2. The weight ratio of the poly-MDI to phenolic polyol in this example is 75/25.

TABLE 1

| WEIGHT (grams) | COMPONENT |
| --- | --- |
| 4540 | Minnesota sand |
| 4.5 | silane coupling agent |
| 2.3 | 50% red iron oxide in castor oil |
| 6.9 | 1,3,5-tris(3-(dimethylamino)propyl)-hexahydro-s-triazine (JEFFCAT TR90) |
| 34.2 | Phenolic Polyol comprising 48% phenolic resin, 28% cashew nut oil, 24% castor oil |
| 102.2 | Poly-MDI (32% NCO content) |
| 2.5 | Wetting agent |

TABLE 2

| TIME (minutes:seconds) | ADDITION/COMMENT |
| --- | --- |
| 0:00 | Sand is at 200° F. |
| 0:00 | 4.5 gms silane coupling agent is added over 30 secs |
| 0:00 | JEFFCAT TR90 is added over 20 secs |
| 0:00 | Blend of red iron oxide and Phenolic Polyol is added over 60 seconds |
| 0:10 | Poly-MDI is added over 60 seconds |
| 2:00 | Product is free flowing |
| 3:30 | Wetting agent is added over 5 seconds |
| 4:00 | Product is discharged at 180° F. |

In this and the other examples presented herein, it was noticed that the JEFFCAT TR90 catalyst increased the reaction rate sufficiently that the amperage on the associated mixer was not exceeded as the coating reactants were metered into the proppant solids in the moving mixer. This suggests that the coating became cured at a rate that was consistent with the feed rate so that the liquid viscosity did not increase the electrical load on the mixer. This same method of controlled, metered addition would also apply for other formulations and chemistries under the present invention in order to keep the contents reacting at a rate that does not tax the load on the mixing equipment.

The resin coated sand from the example above tested at 2.75% coating level from the mixer. When subjected to a three day 250° F. autoclave test, the coating level was measured again at 2.34% reflecting the good resistance to hot water removal of the coating.

Example 2

Ten pounds of Genoa 40/70 fracturing sand is heated to 204° F. in a laboratory mixer at which point the following components are added in the sequence and timing as given below in Tables 3 and 4. The weight ratio of the poly MDI to phenolic polyol in this example is 75/25.

TABLE 3

| WEIGHT (grams) | COMPONENT |
| --- | --- |
| 4540 | Genoa sand |
| 4.5 | A1100 silane coupling agent |
| 2.3 | 50% red iron oxide in castor oil |
| 6.9 | JEFFCAT TR90 |
| 18.2 | Phenolic Polyol comprised of 48% phenolic resin, 28% cashew nut oil, 24% castor oil |
| 54.5 | Poly-MDI (32% NCO content) |
| 2.3 | Wetting agent |

TABLE 4

| TIME (minutes:seconds) | ADDITION/COMMENT |
| --- | --- |
| 0:00 | Sand is at 204° F. |
| 0:00 | 4.5 gms A1100 is added over 10 secs |
| 0:00 | JEFFCAT TR90 is added over 10 secs |
| 0:00 | blend of red iron oxide and Phenolic Polyol is added over 30 seconds |
| 0:10 | polyMDI is added over 30 seconds |
| 2:00 | Product is free-flowing |
| 3:30 | Wetting agent is added over 5 seconds |
| 4:00 | Product is discharged at 182° F. |

The resin coated sand from the example above tested as having 1.48% coating from the mixer. When subjected to a three day 250° F. autoclave test, the coating level was measured again at 1.43% reflecting the good resistance to hot water removal of the coating.

Example 3

Ten pounds of Minnesota fracturing sand is heated to 200° F. in a laboratory mixer at which point the following components are added in the sequence and timing as given below in Tables 5 and 6. The weight ratio of the poly MDI to phenolic polyol in this example is 92/8.

TABLE 5

| WEIGHT (grams) | COMPONENTS: |
|---|---|
| 4540 | Minnesota sand |
| 4.5 | A1100 silane coupling agent |
| 2.3 | 50% red iron oxide in castor oil |
| 6.9 | JEFFCAT TR 90 |
| 12 | Phenolic Polyol comprised of 48% phenolic resin, 28% cashew nut oil, 24% castor oil |
| 135 | Poly-MDI (32% NCO content) |
| 2.5 | Wetting agent |

TABLE 6

| TIME (minutes:seconds) | ADDITION/COMMENT |
|---|---|
| 0:00 | Sand is at 202° F. |
| 0:00 | A1100 is added over 20 secs |
| 0:00 | JEFFCAT TR90 is added over 20 secs |
| 0:00 | Blend of red iron oxide and Phenolic Polyol is added over 60 seconds |
| 0:10 | Poly-MDI is added over 60 seconds |
| 2:00 | Product is free flowing |
| 3:30 | Wetting agent is added over 5 seconds |
| 4:00 | Product is discharged at 170° F. |

The resin coated sand from example 3 tested at 2.80% coating level from the mixer. When subjected to a three day 250° F. autoclave test, the coating level was measured again at 2.56% reflecting the good resistance to hot water removal of the coating.

Example 4

One kg of 40/70 Minnesota fracturing sand is heated to 210° F. in a laboratory mixer at which point the following components are added in the sequence and timing as given below in Tables 7 and 8. The weight ratio of the poly-MDI to the aminated polyalkyleneglycol (JEFFAMINE D230) is 63/37.

TABLE 7

| WEIGHT (grams) | COMPONENTS |
|---|---|
| 1000 | Minnesota sand |
| 1 | A1100 silane coupling agent |
| 20 | Poly-MDI (32% NCO content) |
| 12 | JEFFAMINE D230 |

TABLE 8

| TIME (minutes:seconds) | ADDITION/COMMENT |
|---|---|
| 0:00 | Sand is at 210° F. |
| 0:00 | A1100 is added over 10 secs |
| 0:10 | Poly-MDI is added over 30 secs |
| 0:50 | JEFFAMINE D230 is added over 10 secs |
| 2:00 | Product is free flowing |
| 4:00 | Product is discharged at 140° F. |

The resin coated sand from the example above tested at 2.90% coating level from the mixer. When subjected to a three day 250° F. autoclave test, the coating level was measured again at 2.83% reflecting the good resistance to hot water removal of the coating.

Example 5

One kg of 40/70 Minnesota fracturing sand is heated to 210° F. in a laboratory mixer at which point the following components are added in the sequence and timing as given below in Tables 9 and 10. The weight ratio of the poly-MDI to the aminated polyalkyleneglycol (JEFFAMINE D230 from Huntsman Corporation) is 63/37.

TABLE 9

| WEIGHT (grams) | COMPONENTS |
|---|---|
| 1000 | Minnesota sand |
| 1 | A1100 silane coupling agent |
| 20 | Poly-MDI (32% NCO content) |
| 12 | Aminated polyalkyleneglycol |
| 0.6 | Triethylenediamine |

TABLE 10

| TIME (minutes:seconds) | ADDITION/COMMENT |
|---|---|
| 0:00 | Sand is at 210° F. |
| 0:00 | A1100 is added over 10 secs |
| 0:10 | Poly-MDI is added over 30 secs |
| 0:50 | Preblended Aminated polyalkyleneglycol and Triethylenediamine are added over 10 s |
| 2:00 | Product is free flowing |
| 4:00 | Product is discharged at 145° F. |

The resin coated sand from the example above tested at 2.84% coating level from the mixer. When subjected to a three day 250° F. autoclave test, the coating level was measured again at 2.63% reflecting the good resistance to hot water removal of the coating.

Example 6

In this example, a series of test results were performed to demonstrate the properties of proppant coatings that include completely reacted (pre-cured) and partially cured phenolic coatings as compared to the coating of the present invention ("new technology coating"). The graph in FIG. 1 illustrates the TMA results for (a) Pre-cured phenolic coated sand, (b) New Technology coated sand using the formulation of Example 1, (c) a partially cured, phenolic-coated sand (also identified as Phenolic A) and (d) a somewhat more curable, phenolic-coated sand (also identified as Phenolic B)

The ThermoMechanical Analyzer (TMA) as supplied by TA Instruments is a device that accurately imposes a small force (i.e., a load) onto a sample which is then subjected to a desired temperature ramp over a defined time. During this increasing temperature period, the force is held constant. The probe which imposes the force is connected to a sophisticated micrometer that is capable of measuring fractions of a micron change in the position of the probe. Any change in the position of the probe can be interpreted to reflect an expansion or contraction of the sample that is brought about by the temperature change(s). In many applications, the sample merely expands as it is being heated (for instance raw sand) thereby creating a database that refers to the coefficient of thermal expansion. The TMA has the ability to run the samples in a variety of environments.

In general, a pre-cured, phenolic-coated sand will be characterized by a plot that is essential flat (parallel to the X axis) or has a positive slope. This response is indicative of a coating that is essentially reacted in which there is little to no remaining reactivity that remains in the coating.

If, however, a more curable or partially cured phenolic coating is tested, the TMA plot will exhibit a negative slope as early as 80° C. to 100° C., but more often after about 125° C. to about 175° C. This type of plot is characteristic of a coating that has retained a level of reactivity even after completing the manufacturing process. The more negative the slope and the lower the temperature in which the slope turns negative, the more reactivity that has been left in the coating.

As shown in FIG. 1, the top curve is labeled "Pre-cured" and is indicative of the response of a phenolic coating that is no longer reactive. The two lower curves are labeled "Partially Cured Phenolic A" and "More Curable Phenolic B." These curves represent the TMA results from two levels of partially cured coatings. The second curve labeled "New Technology" shows a response that is similar to the pre-cured coating curve but actually shows properties that fall between a pre-cured coating and the less reactive partially cured coating. The shape of the New Technology curve indicates that the New Technology coating would exhibit some properties that are similar to a pre-cured coating and others that may be similar to the partially cured coatings.

Figure 2:
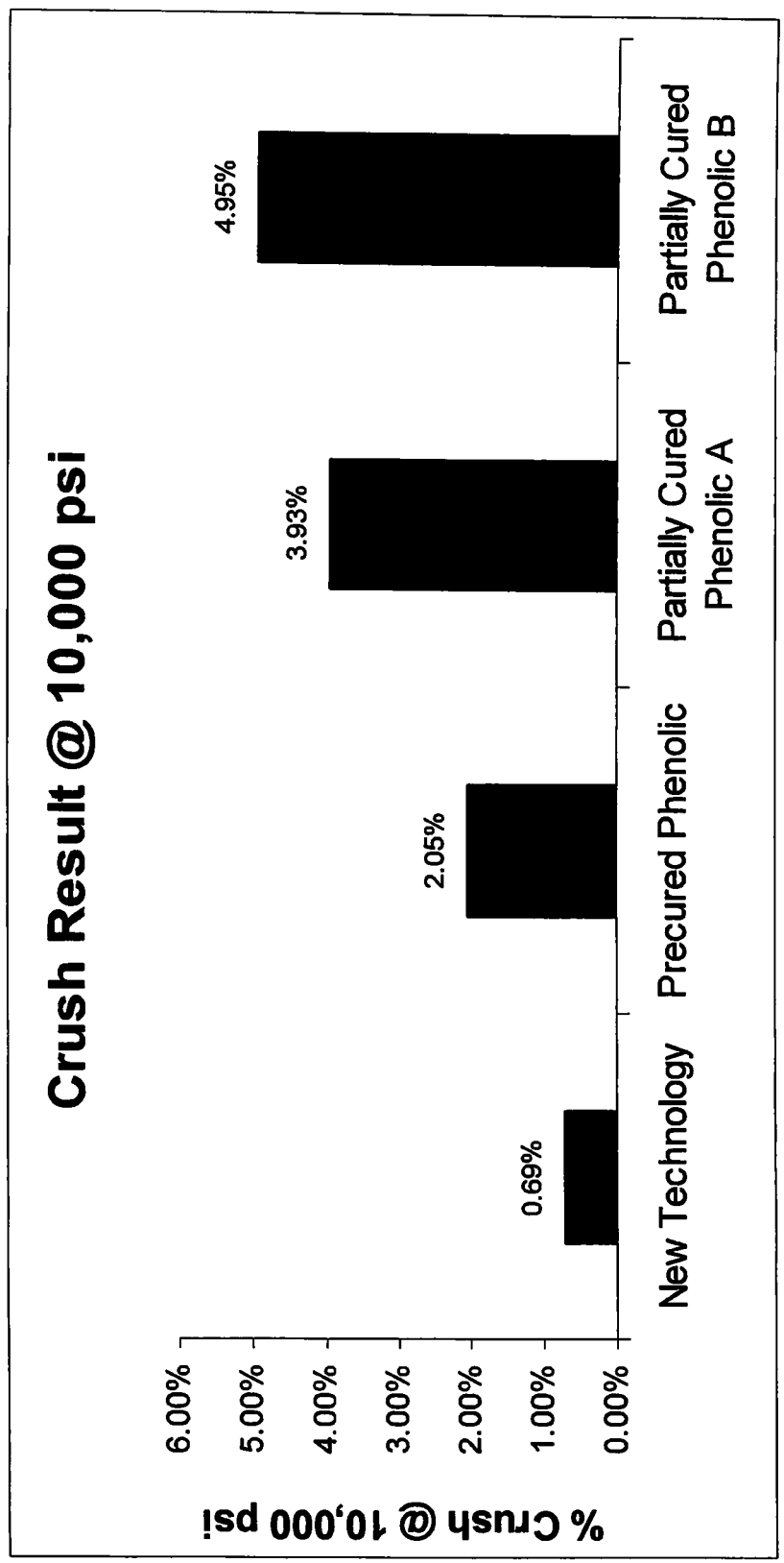
FIG. 2 is a bar chart of crush test results of various coated proppants tested in Example 6.

The plot of "Crush Results" in FIG. 2 illustrates the comparable strength of sand coated with pre-cured phenolic coating, two partially cured coatings (labeled A and B) and the New technology coating. Historically, the pre-cured phenolic coated sand would show a lower crush percentage (in the ISO test procedure) than partially cured coated sand. These crush test results follow this trend with the pre-cured coating sand having a crush of 2.05% and the two partially coatings (Phenolic coatings A and B) having crushes of 3.93% and 4.95% respectively. It is important to notice that the coating having the more remaining reactivity (Phenolic B) has the highest crush value. The New Technology coating actually tested out having the lowest crush value (0.69%). So in the crush evaluation The New Technology coating performed like a superior, pre-cured coated sand.

Figure 3:
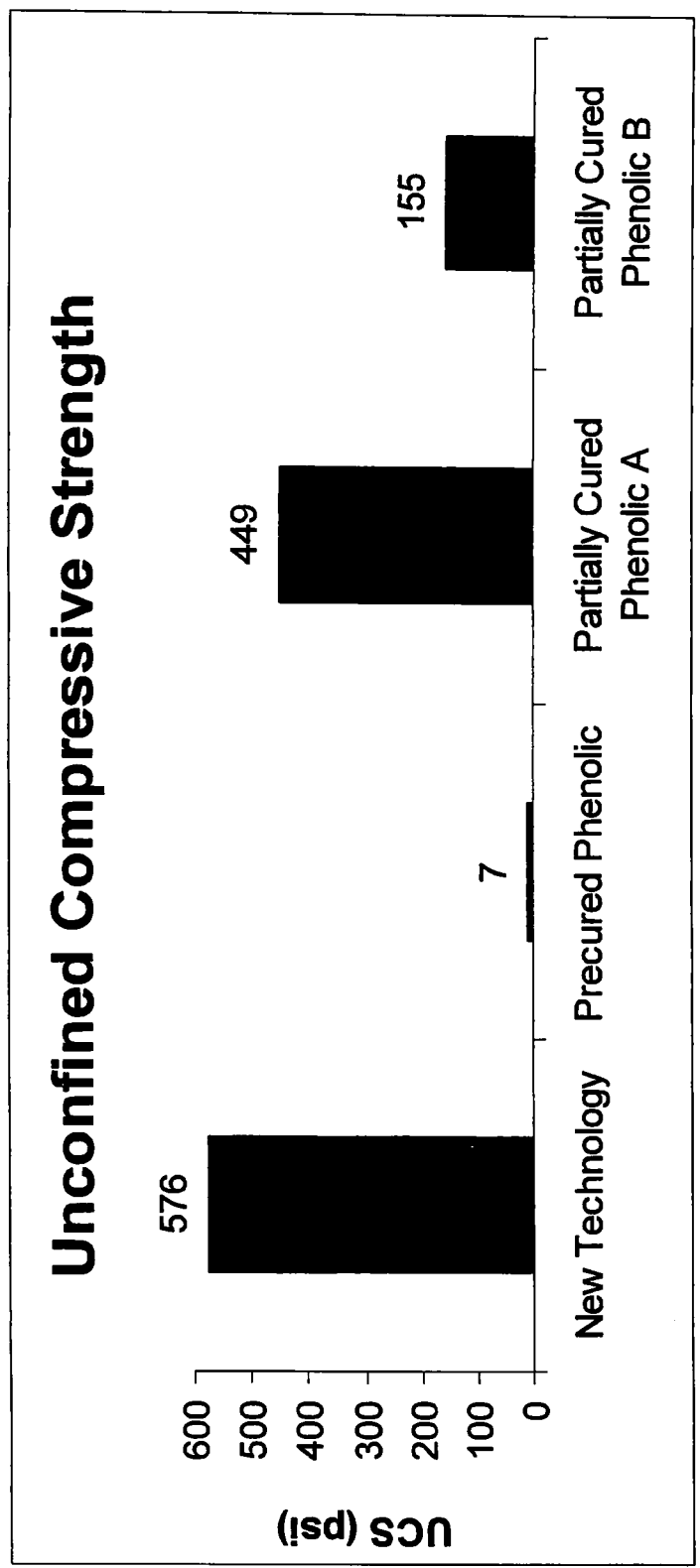
FIG. 3 is a chart of Unconfined Compressive Strength for the coated proppants of Example 6.
Figure 5:
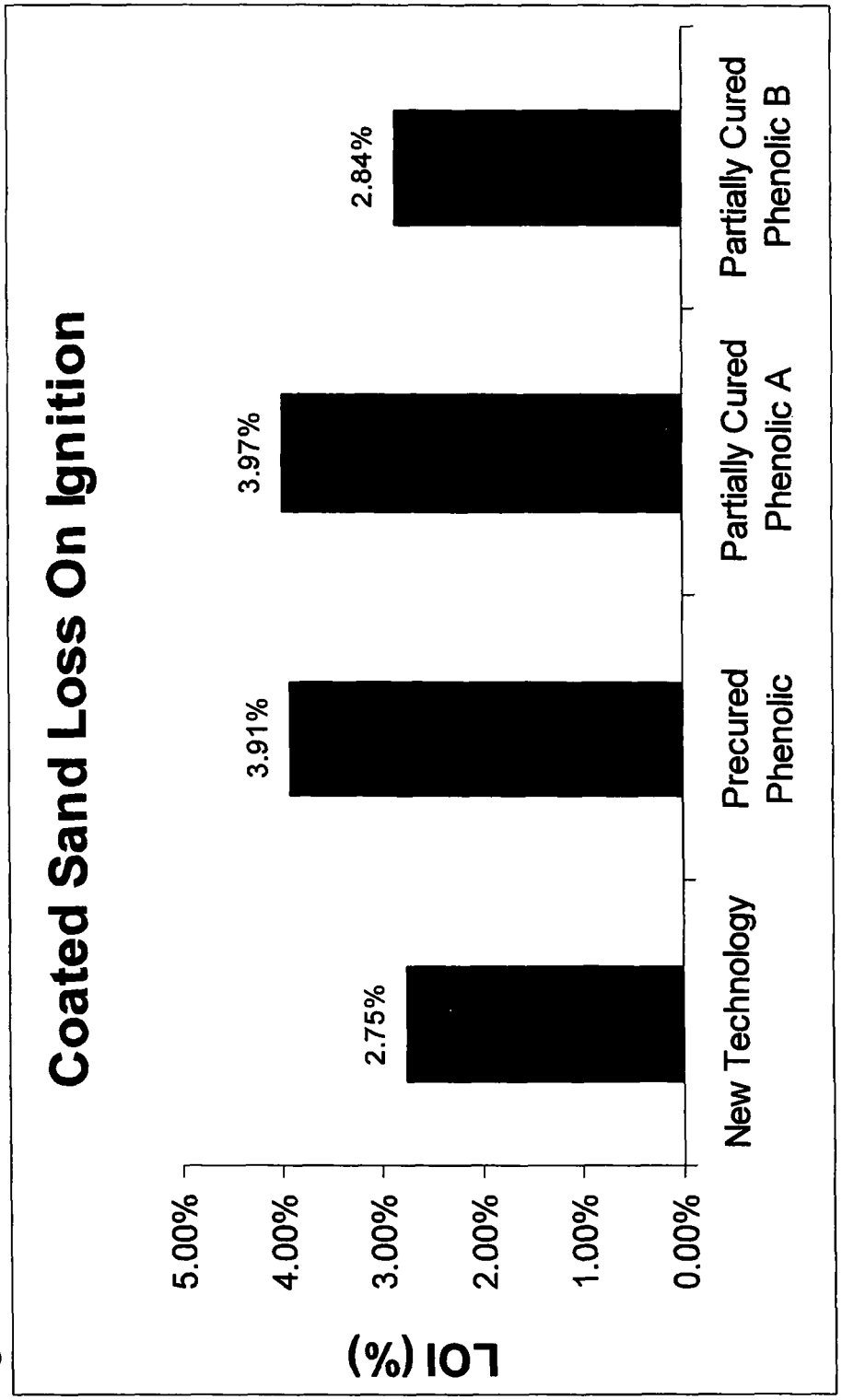
FIG. 5 depicts the results of coating loss tests in simulated well down-hole conditions.

The plot entitled "Unconfined Compressive Strength" in FIG. 3 represents a strength measurement of the particle to particle bonds of a coated proppant sand. Historically, a pre-cured coated phenolic sand possess little if any ability to form particle to particle bonds of any measurable strength. In this test the coating labeled Phenolic A exhibited a bond strength UCS of 449 psi. The coating labeled Phenolic B had a UCS of 155 psi. Since the TMA indicated that Phenolic B was a more reactive coating than Phenolic A, one would expect that the UCS results should be reversed. That would be true if the coated sands had the same resin level (LOT). However the plot entitled "Coated Sand Loss On Ignition" in FIG. 5, shows that Phenolic A actually has a 3.97% phenolic coating while phenolic coating B has a 2.84% resin coating. This could be one explanation for the unexpected UCS results.

In FIG. 3, the pre-cured phenolic coating sand showed only a weak bonding capability with a measurement of 7 psi. This level of bonding would indicate that the pre-cured phenolic coating is not capable of forming particle-to-particle bonds that would consolidate the proppant or be effective in controlling proppant flowback.

The New Technology coating exhibited the TMA appearance of a pre-cured coated sand in FIG. 1, it yielded the highest bond strength (UCS=576 psi) of any sample tested. See FIG. 3. These dual results are new and unexpected for a coated proppant.

Figure 4:
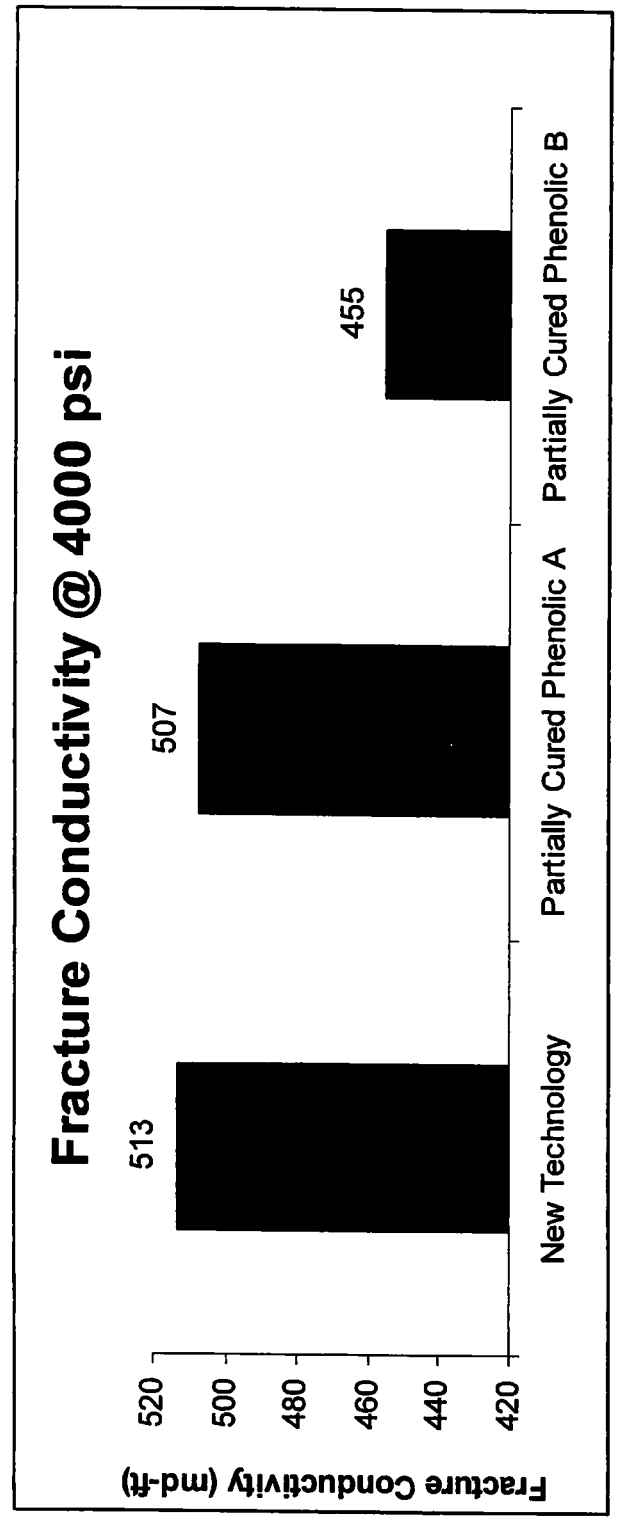
FIG. 4 charts the fracture conductivity of three coated proppants used in Example 6.

The plot entitled "Fracture Conductivity @ 4000 psi" in FIG. 4 reveals a data point from a long term conductivity test. Presented on the plot are the conductivity numbers for the two partially cured phenolic coated sands and a sand coated with the New Technology. Historically, the conductivity test results for a partially cured phenolic coating will meet or exceed that of a pre-cured coating. The plot shows that the New Technology coating has a conductivity similar to the partially cured coating of Phenolic A and superior to partially cured coating of Phenolic B. This is in spite of the fact the Phenolic A has a significantly higher coating level than the New technology and Phenolic B is marginally higher than the New Technology coating (see FIG. 5).

In summary, The New Technology coated sand exhibits the thermal properties of a pre-cured phenolic coated sand and crush resistance superior to a pre-cured phenolic coating. It also shows a bonding capability superior to the partially cured phenolic coated sand and a comparable if not superior fracture conductivity (when measured at 4,000 psi in a long term conductivity test). This would seem to indicate that the new technology contains traits and performance properties from both type coating and would best be described as a "hybrid" coating technology.

Example 7

A proppant coating formulation for Example 7 was prepared with an Iso:Polyol ratio of 0.65 equivalent weight at a process temperature of 198° F. (92° C.) and made from the curable coating ingredients shown in Table 11:

TABLE 11

| INGREDIENT | WEIGHT (LBS.) |
|---|---|
| Sand | 1000.00 |
| Dynasylan AMEO (Silane)* | 1.00 |
| Red 2B in Castor Oil | 1.00 |
| Dow 801X Polyol | 19.34 |
| Dow ISO (XUS17557.00) | 20.11 |
| Dabco T-12 (DBTDL) | 0.17 |
| $SiO_2 \cdot OH$ | 2-12 |
| Chemicals | 43.62-53.62 |

*Dynasylan ® AMEO from Evonik Degussa Corporation in Chester, PA is a bifunctional silane possessing a reactive primary amino group and hydrolyzable ethoxysilyl groups. The dual nature of its reactivity is represented by its manufacturer to allow Dynasylan ® AMEO to bind chemically to both inorganic materials (e.g. glass, metals, fillers) and organic polymers (e.g. thermosets, thermoplastics, elastomers) thus functioning as an adhesion promoter, crosslinker, and/or surface modifier.

Table 12 shows the timing and duration for the order of addition of the components making up the curable coating mixture of the invention.

TABLE 12

| COMPONENT | START TIME (s) | DURATION (s) | END TIME (s) |
|---|---|---|---|
| Silane | 0 | 3 | 3 |
| Color | 5 | 10 | 15 |
| Polyol & catalyst | 20 | 60 | 80 |
| Isocyanate | 30 | 60 | 90 |
| Additive | 120 | 20 | 140 |
| Discharge | 180 | | |

What results from the above coating and curing process is a substantially cured and coated proppant having handling characteristics like a pre-cured, resin-coated proppant but with the ability to form interparticle bonds under downhole conditions like a curable, resin-coated proppant. The resulting product is then further contacted with a finely divided anticaking agent, like an amorphous silica or silica substitute in dry form or as a dispersion.

The preferred anticaking agents are either a dry form of very small amorphous silica or a dispersion of nanometer-sized fumed silica. The following Table 13 summarizes the differences between the additives:

TABLE 13

| ANTICAKING AGENT | % SOLIDS | SURFACE AREA | PARTICLE SIZE | STARTING CONC. WT. % | LBS/1000 LBS |
|---|---|---|---|---|---|
| Colloidal silica | 30 | Medium-High | 50-100 nm | 0.300 | 10.00 |
| 1$^{st}$ Dispersion (aq) of fumed silica | 15 | Low | <20 nm | 0.075 | 5.00 |
| 2nd Dispersion (aq) of fumed silica | 20 | Medium | <20 nm | 0.075 | 3.75 |
| 3$^{rd}$ Dispersion (aq) of fumed silica | 30 | Low | <20 nm | 0.075 | 2.50 |

Tests of unconfined compressive strength with a conventional proppant tester at 125° F. (52° C.), 24 hour shut-in, 1000 psi with a 2 wt % KCl solution and without use of a bond activator plasticizer show that a 16/30 size of coated proppant sand according to the invention exhibits an unconfined compressive strength of 100 psi, and a 20/40 size blend of coated sand exhibits an unconfined compressive strength of 92 psi. Comparative tests against similarly sized proppants that use a partially-cured phenolic resin coating and 1.5 wt % of a bond activator plasticizer show no unconfined compressive strength under the same conditions. In other words, the coated proppant of the invention forms a shaped sample exhibiting interparticle bonding of 92-100 UCS while the phenolic resin proppant remains loose particulates that show no interparticle bond strength even though an activator was added to promote such bonds.

Some time is necessary before adequate interparticle bonds are developed when using the present invention. The bonds do not form instantaneously in low temperature wells at 100-125° F. (38°-52° C.). Generally, at least about 5 hours is desirable with at least 12 hours is useful for most low temperature wells with proppants according to the present invention. This is referred to in the industry as the "shut-in" time in which the proppant is subjected to downhole conditions that reflect healing and crack closure of the fractured field strata which exert compressive stresses on the coated proppants within the fracture cracks.

Figure 6:
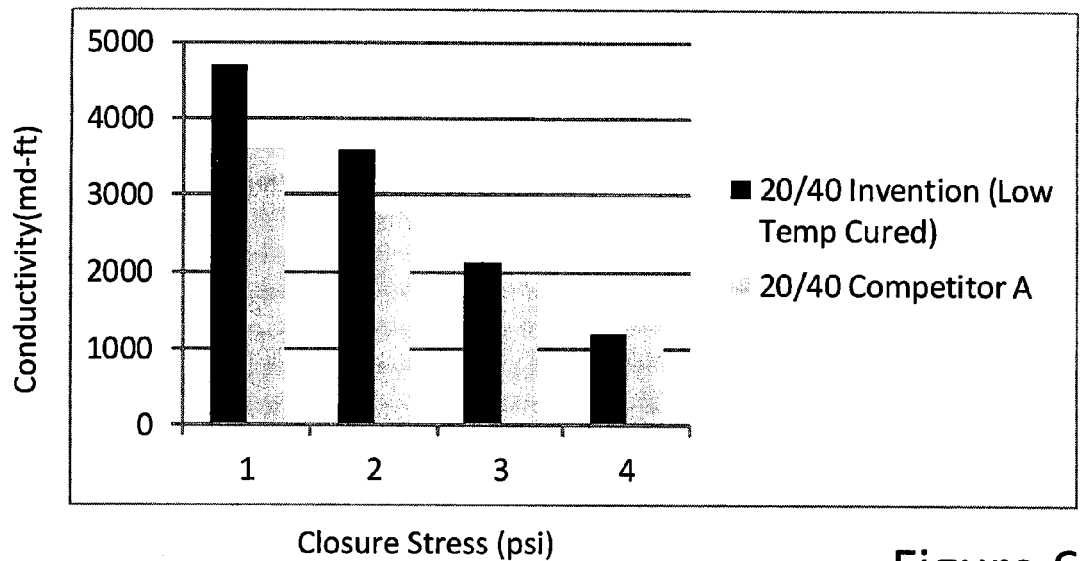
FIGS. 6 and 7 illustrate the results of comparative conductivity tests in a simulated low temperature well using a proppant according to the present invention and a prior art proppant coated with a phenolic resin.
Figure 7:
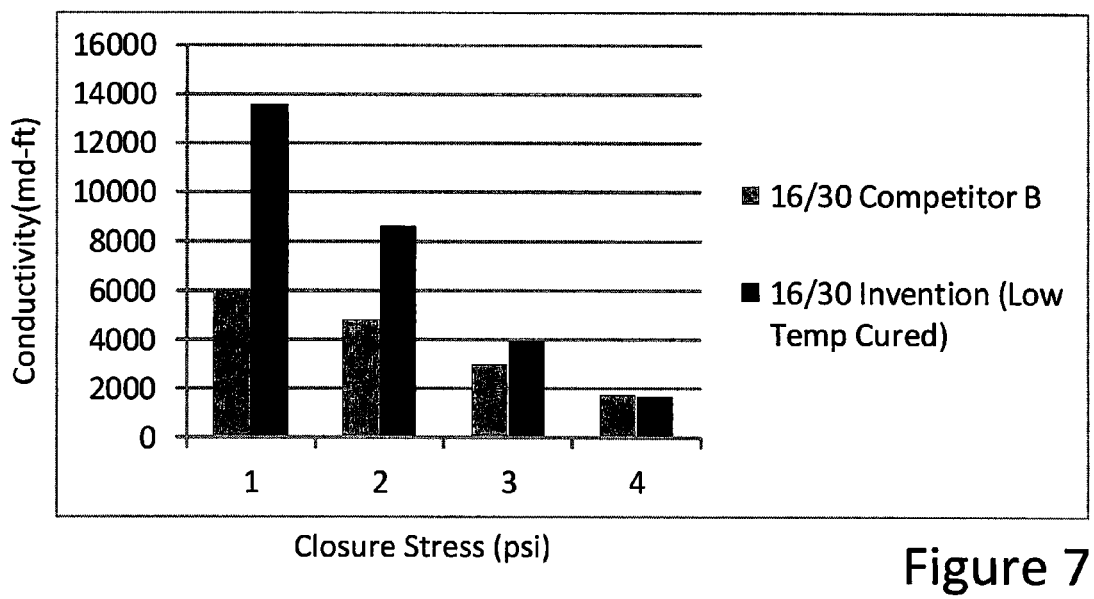

FIGS. 6 and 7 show the results of comparative conductivity tests reflected in Table 14 below that compare the proppants of Example 7 against two proppants with partially cured phenolic coatings. FIGS. 6 and 7 show that the 16/30 proppant of the invention exhibits a 79% greater conductivity at 2000 psi and a 32% higher conductivity at 4000 psi than the prior art phenolic proppant coating. FIG. 7 shows similar results with the 20/40 proppant with a 29% higher conductivity at 2000 psi and 13% greater at 4000 psi.

TABLE 14

| | Conductivity (md-ft) | | | |
|---|---|---|---|---|
| | CLOSURE STRESS (psi) | | | |
| SAMPLE | 1K | 2K | 4K | 6K |
| 20/40 Invention (Low Temp Cured) | 4703 | 3574 | 2117 | 1192 |
| 20/40 Competitor A | 3615 | 2773 | 1877 | 1317 |
| 16/30 Competitor B | 6014 | 4826 | 2970 | 1735 |
| 16/30 Invention (Low Temp Cured) | 13563 | 8640 | 3945 | 1701 |

Hot water leaching tests show that the proppant coatings of the present invention show that the coating is highly resistant to leaching on components and unreacted materials. Indeed, the test water after the test was classifiable as safe to the limits of tap water for drinking. This contrasts with many phenolic coatings that can leach phenols and formaldehyde after prolonged exposure to hot water.

Example 8

High temperature wells present other performance issues for coated proppants and the formation of a consolidated pack yet there is a continued need for proppant coatings that can produce interparticle bonds despite extended exposure to an elevated temperature of at least 200° F. (93° C.) for a period of time, e.g., at least about two hours or longer, without interparticle contact due to closure stress while also reducing the generation of loose fine, resisting cyclic stress and being compatible with frac fluids, breakers and environmental concerns. The coating of this example is specifically directed to a coating that is well suited to higher temperature wells.

A 30/50 sand coating according to the invention was prepared having the ingredients in the curable mixture as shown in Table 15 in amounts sufficient to form a 1.75 wt % coating on the underlying sand core solid. The sand was pre-heated to 210° F. (99° C.).

TABLE 15

| INGREDIENTS | AMOUNT (GMS) |
|---|---|
| Sand | 2000.00 |
| Polyol | 7.90 |
| Dynasylan AMEO | 2.00 |
| Distilled Water | 0.00 |
| ISO | 23.70 |
| Chembetain CAS Surfactant | 3.00 |
| Dabco TMR | 0.21 |
| Dabco T-12 | 0.10 |
| Black colorant in Castor Oil | 2.00 |
| NanoArc AL-2125 | 0.00 |
| Green colorant in Castor Oil | 0.00 |
| Chemical | 38.92 |
| Total | 2038.92 |

The ingredients of the curable mixture were added at the times and for the durations shown in Table 16.

TABLE 16

| INGREDIENT | START (S) | DURATION (S) | END (S) |
|---|---|---|---|
| Silane | 0 | 5 | 5 |
| Colorants in Oil | 5 | 5 | 10 |
| Catalyst + Polyol | 20 | 60 | 80 |
| ISO | 30 | 60 | 90 |
| CAS | 95 | 5 | 100 |
| Discharge | 180 | | |

The coated sand of Example 8 and two prior art proppants with partially cured phenolic coatings were then subjected to an unconfined compressive strength test using the equipment and materials described in Example 7 but operated at 250° F. (121° C.). In one set of conditions, the proppants were subjected to a three hour preheating that would be characteristic of the exposure times and temperatures found in a high temperature well. A comparison set of tests was performed without the preheating to gauge the ability of the proppant to resist the effects of extended exposure to heat before closure stress was applied. The results are shown in FIG. 8.

Figure 8:
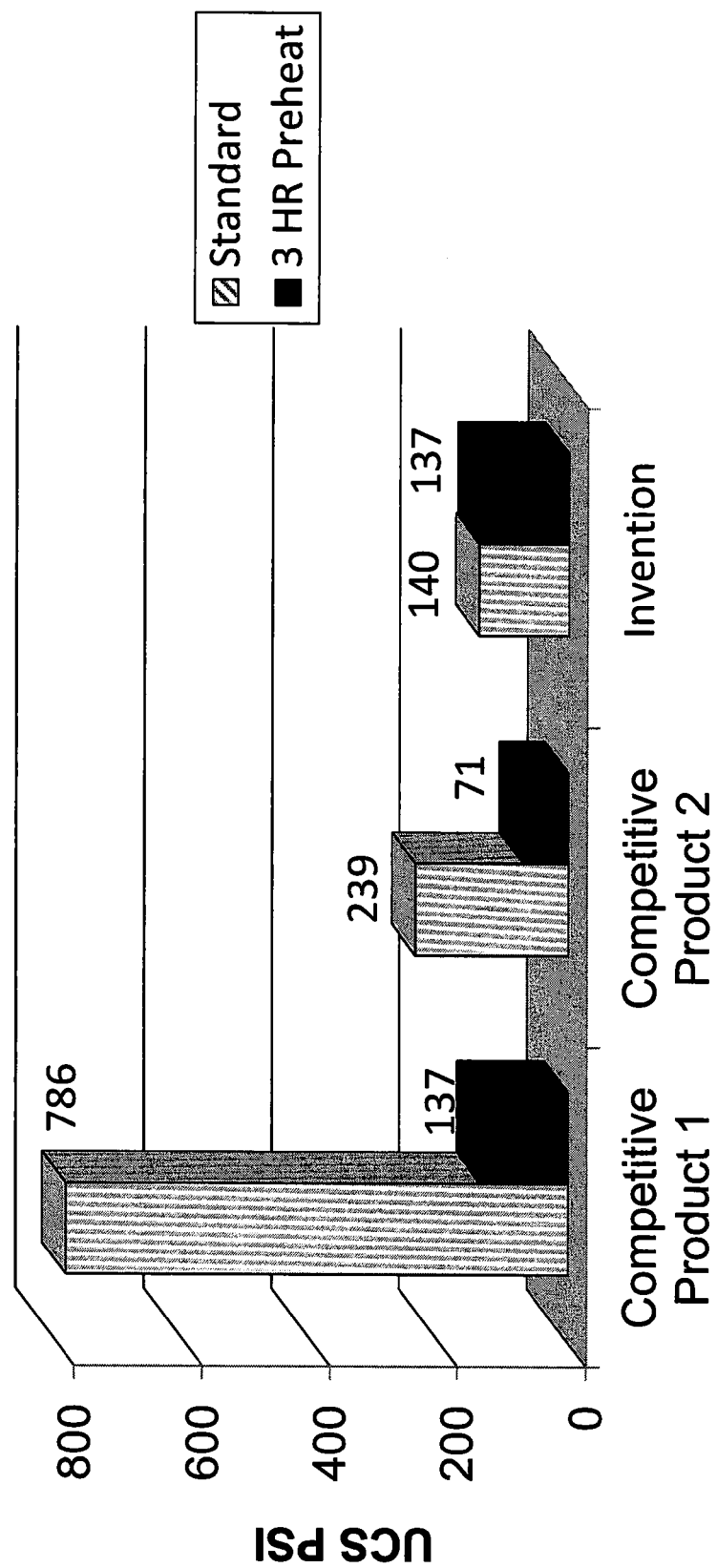
FIG. 8 shows the results of high temperature tests for unconfined compressive strength under high temperature well conditions and either with or without a three hour preheat exposure.

Inspection of FIG. 8 will show that both prior art coated proppants (Competitive Product 1 and Competitive Product 2) exhibit good UCS when there was no preheating and substantially diminished UCS when preheating was experienced. In contract, the coated proppant of the invention experienced consistent performance that was the same as, or better than, the prior art proppant products.

Once those skilled in the art are taught the invention, many variations and modifications are possible without departing from the inventive concepts disclosed herein. The invention, therefore, is not to be restricted except in the spirit of the appended claims

What is claimed:

1. A method for producing free-flowing, substantially cured, coated proppant solids having a substantially cured polyurethane resin coating that forms interparticle bonds under downhole conditions, the method comprising:
    coating proppant solids coated with a bifunctional silane having a reactive primary amino group and a hydrolysable ethoxysilyl group, wherein said solids have been heated to temperature of about 50 to about 150° C. with a curable coating formulation without the use of an organic solvent;
    reacting the curable coating formulation coated onto said proppant solids under conditions sufficient to substantially cure said curable coating formulation,
    wherein the curable coating formulation comprises an isocyanate-functional component having at least 2 isocyanate groups, and a polyol-functional component comprising a polyether polyol, wherein the formulation comprises an excess functional equivalent weight of the isocyanate-functional component relative to the polyol-functional component;
    wherein said coating and reacting occurs simultaneously and in a period of time of less than about four minutes to form the free-flowing, substantially cured, coated proppant solids.

2. The method according to claim 1, wherein said curable coating formulation comprises a functional equivalent amount of said isocyanate-functional component that is about 200 to about 400% more than the polyol-functional component.

3. The method according to claim 1, wherein said proppant solids exhibits an average particle size from about 50 µm to about 3000 µm.

4. The method according to claim 1 wherein said curable coating formulation comprises an aliphatic polyol.

5. The method according to claim 1 wherein said coating occurs simultaneously with said curing at a temperature from about 75° C. to about 150° C.

6. The method according to claim 1 wherein said method comprises adding to said coating as it cures an ion exchange resin or dissolvable solid that when dissolving releases a scale inhibitor.

7. The method according to claim 1, the method further comprising contacting the substantially cured, coated proppant solids with an anticaking agent.

8. The method according to claim 7 wherein said anticaking agent comprises amorphous silica.

9. A method for producing free-flowing, substantially cured, coated proppant solids having a substantially cured polyurethane resin coating that forms interparticle bonds under downhole conditions, the method comprising:
    coating proppant solids coated with a bifunctional silane having a reactive primary amino group and a hydrolysable ethoxysilyl group, wherein said solids have been heated to temperature of about 50 to about 150° C. with a curable coating formulation without the use of an organic solvent; and
    reacting the curable coating formulation to react under conditions sufficient to substantially cure said proppant solids coated with said curable coating formulation,
    wherein the curable coating formulation comprises an isocyanate-functional component having at least 2 isocyanate groups, and a polyol-functional component comprising a polyether polyol, wherein the formulation comprises an excess functional weight % of the isocyanate-functional component relative to the polyol-functional component;
    wherein said coating and reacting occurs simultaneously and in a period of time of less than about four minutes to form the free-flowing, substantially cured, coated proppant solids, and
    wherein the isocyanate-functional component has an excess functional weight % of about 110 to about 430% relative to the polyol-functional component.

* * * * *